United States Patent
Moon et al.

(10) Patent No.: US 10,224,747 B2
(45) Date of Patent: Mar. 5, 2019

(54) ANTENNA FOR WIRELESS POWER, AND DUAL MODE ANTENNA COMPRISING SAME

(71) Applicant: LS CABLE & SYSTEM LTD., Anyang-si, Gyeonggi-do (KR)

(72) Inventors: Sung-Hoon Moon, Bucheon-si (KR); Heung-Kyu Lee, Suwon-si (KR); Ji-Hyung Lee, Suwon-si (KR); Min-Seok Han, Suwon-si (KR); Lae-Hyuk Park, Seoul (KR); Young-Sun Kim, Gunpo-si (KR); Un-Kyu Park, Seoul (KR); Sung-Han You, Seoul (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/696,710

(22) Filed: Sep. 6, 2017

(65) Prior Publication Data
US 2017/0366013 A1  Dec. 21, 2017

Related U.S. Application Data

(62) Division of application No. 14/651,513, filed as application No. PCT/KR2013/011560 on Dec. 12, 2013.

(30) Foreign Application Priority Data

Dec. 12, 2012 (KR) ........................ 10-2012-0144543
Jan. 8, 2013 (KR) ........................ 10-2013-0002286

(51) Int. Cl.
*H02J 50/10* (2016.01)
*H02J 50/12* (2016.01)
(Continued)

(52) U.S. Cl.
CPC ............... *H02J 50/10* (2016.02); *H01Q 1/38* (2013.01); *H01Q 7/00* (2013.01); *H01Q 21/30* (2013.01);
(Continued)

(58) Field of Classification Search
None
See application file for complete search history.

(56) References Cited

U.S. PATENT DOCUMENTS 4,392,013 A    7/1983  Ohmura et al.
6,304,232 B1 * 10/2001  Brown ............ G06K 19/07749
                                                343/700 MS
(Continued)

FOREIGN PATENT DOCUMENTS

CN    101233666 A    7/2008
CN    102157989 A    8/2011
(Continued)

OTHER PUBLICATIONS

International Search Report for PCT/KR2013/011560 dated Apr. 23, 2014 from Korean Intellectual Property Office.
(Continued)

*Primary Examiner* — Jared Fureman
*Assistant Examiner* — James Evans
(74) *Attorney, Agent, or Firm* — K&L Gates LLP

(57) ABSTRACT

Provided is a wireless power antenna for wirelessly transmitting, receiving, or relaying power, the wireless power antenna comprising an insulating sheet and a wireless power coil including a split pattern unit including a plurality of patterns spaced from each other in at least a region thereof in a widthwise direction, wherein the split pattern unit is disposed on both a top surface and a bottom surface of the insulating sheet.

11 Claims, 23 Drawing Sheets

(51) Int. Cl.
*H02J 50/23* (2016.01)
*H01Q 1/38* (2006.01)
*H02J 7/02* (2016.01)
*H01Q 7/00* (2006.01)
*H01Q 21/30* (2006.01)

(52) U.S. Cl.
CPC .............. *H02J 7/025* (2013.01); *H02J 50/12* (2016.02); *H02J 50/23* (2016.02)

(56) References Cited

U.S. PATENT DOCUMENTS

| | | | |
|---|---|---|---|
| 6,362,716 B1* | 3/2002 | Anbo | H01F 17/0013 336/200 |
| 2008/0157272 A1 | 7/2008 | Tanaka | |
| 2008/0211455 A1 | 9/2008 | Park et al. | |
| 2008/0278380 A1* | 11/2008 | Miyoshi | H01Q 1/2258 343/700 MS |
| 2009/0243781 A1* | 10/2009 | Nomura | H01F 17/0013 336/200 |
| 2010/0194334 A1 | 8/2010 | Kirby et al. | |
| 2011/0065383 A1 | 3/2011 | Frankland et al. | |
| 2012/0274148 A1* | 11/2012 | Sung | H04B 5/0037 307/104 |
| 2013/0199028 A1* | 8/2013 | Singh | A61N 1/0553 29/602.1 |
| 2013/0267170 A1* | 10/2013 | Chong | H04B 1/3833 455/41.1 |
| 2014/0375262 A1* | 12/2014 | Yamaguchi | H02J 50/90 320/108 |
| 2015/0145628 A1* | 5/2015 | Kim | H05K 1/165 336/137 |
| 2015/0333536 A1* | 11/2015 | Ganem | H02J 5/005 307/104 |

FOREIGN PATENT DOCUMENTS

| | | |
|---|---|---|
| JP | 2003-006589 A | 1/2003 |
| JP | 2012-019302 A | 1/2012 |
| JP | 2012-200130 A | 10/2012 |
| KR | 1020040063286 A | 7/2004 |
| KR | 10-0637078 B1 | 10/2006 |
| KR | 10-2007-0015264 A | 2/2007 |
| KR | 1020107028149 | 6/2009 |
| KR | 10-2010-0026075 A | 3/2010 |
| KR | 10-2011-0035196 A | 4/2011 |
| KR | 10-1118471 B1 | 3/2012 |
| KR | 1020130000926 A | 3/2013 |

OTHER PUBLICATIONS

Chinese Search Report for CN Application No. 2013800653660 dated Jul. 18, 2016 from Chinese Patent Office.
Korean Office Action for related Korean Application No. 10-2012-0144543; action dated May 29, 2018; (6 pages).
Korean Office Action dated Nov. 16, 2018 corresponding to Korean Patent Application No. 10-2013-0002286.

\* cited by examiner

ANTENNA FOR WIRELESS POWER, AND DUAL MODE ANTENNA COMPRISING SAME

CROSS REFERENCE TO PRIOR APPLICATIONS

This application is a Divisional Application of U.S. patent application Ser. No. 14/651,513 (filed on Jun. 11, 2015), which is a National Stage Patent Application of PCT International Patent Application No. PCT/KR2013/011560 (filed on Dec. 12, 2013) under 35 U.S.C. § 371, which claims priority to Korean Patent Application Nos. 10-2012-0144543 (filed on Dec. 12, 2012) and 10-2013-0002286 (filed on Jan. 8, 2013), which are all hereby incorporated by reference in their entirety.

BACKGROUND OF THE INVENTION

Field of the Invention

One or more aspects of the present invention relate to a wireless power antenna and a dual mode antenna including the same.

Background Art

Recently, much attention has been paid to energy-IT convergence technology. The energy-IT convergence technology means fusing of the existing energy technology with IT technology that has been rapidly advanced. Wireless power transfer (WPT) technology is a field of energy-IT convergence technology. The WPT technology is technology of supplying power in a wireless manner without using the existing power lines. Since a home appliance or the like may be wirelessly charged using the WPT technology without connecting the home appliance or a power cable as a charger to an electrical outlet, research has been actively conducted on the WPT technology.

Examples of WPT technology that have been commonly used or on which research has been conducted include a magnetic induction method and a magnetic resonance method. WPT technology employing the magnetic induction method is a method using magnetic induction occurring between two coils, and enables power of several watts to be transmitted within a range of a distance of several mm to several cm. Thus, the WPT technology employing the magnetic induction method has been applied to transportation cards, wireless razors, electric toothbrushes, etc. The WPT technology employing the magnetic resonance method is a method of transmitting power using a resonant coupling at a resonant frequency. When the WPT technology employing the magnetic resonance method is used, power of several tens of watts may be transmitted within a range of a distance of several meters or less. In this case, the efficiency of transmitting power is influenced by a quality factor of a resonator. In this connection, inductor structures having an improved quality factor have been disclosed in US 2008/0157272 (hereinafter referred to as 'prior document 1'), KR 0637078 (hereinafter referred to as 'prior document 2'), U.S. Pat. No. 4,392,013 (hereinafter referred to as 'prior document 3'), etc. However, in prior documents 1 and 2, a metal layer is disposed only on one side of a substrate and thus a turn ratio required to form an antenna is not likely to be secured. Prior document 3 simply discloses a method of manufacturing a fine-pattern film.

In a large number of mobile terminals that have been recently put on the market, a near-field communication (NFC) module is installed to establish NFC.

NFC is a proximity communication technology whereby data can be transmitted or received within a range of a distance of about 10 cm using a frequency of 13.56 MHz. The NFC module may be installed in mobile terminals and used in various fields of user authentication, identification, credit cards, mobile tickets, mobile coupons, etc.

An NFC antenna (coil) is required to establish NFC. In the NFC antenna, an antenna for an NFC reader and an antenna for an NFC tag are independently included. Actually, an integrated dual antenna structure including a stack structure of an NFC reader antenna and an NFC tag antenna is generally used in mobile terminals.

Also, an additional wireless power transmission antenna (coil) is required to wirelessly transmit power. Thus, in order to support both an NFC function and a wireless power transmission function, antennas for the respective functions should be installed together in a mobile terminal. In this case, an antenna installation space is small since the size of the mobile terminal is limited, and the size and thickness of the mobile terminal increase due to two types of antennae.

Thus, there is a need to develop a technique of minimizing a necessary antenna installation space while installing an NFC antenna and a wireless power transmission antenna together.

Such a technique has been disclosed in US 2010-0194334 (hereinafter referred to as 'prior document 4'). Prior document 4' discloses a power circuit for wirelessly transmitting power and establishing NFC. An electronic device including the power circuit includes a back housing having a wireless power receiving antenna and a converting circuit. Although prior document 4 discloses that the wireless power receiving antenna may be used to perform a function of wirelessly supplying power or an NFC function, a structure of simultaneously performing these functions is not particularly disclosed.

SUMMARY OF THE INVENTION

One or more embodiments of the present invention include a wireless power antenna and a dual mode antenna which have simple structures but can greatly improve a quality factor. In detail, one or more embodiments of the present invention are directed to improving the quality factor by preventing a non-conducting region from occurring in a conductor due to the skin effect.

One or more embodiments of the present invention include a wireless power antenna capable of securing a turn ratio required to form a wireless power coil pattern on a narrow insulating sheet.

One or more embodiments of the present invention include a dual mode antenna configured to wirelessly transmit, receive, or relay power and establish NFC by using one antenna.

To achieve these objects, the present invention provides a wireless power antenna for wirelessly transmitting, receiving, or relaying power, the wireless power antenna comprises an insulating sheet and a wireless power coil including a split pattern unit including a plurality of patterns spaced from each other in at least a region thereof in a widthwise direction, wherein the split pattern unit is disposed on both a top surface and a bottom surface of the insulating sheet.

The wireless power antenna further comprises a pair of wireless power connection terminals formed on one surface of the insulating sheet and electrically connected to both ends of the wireless power coil, and wherein the split pattern unit is spaced a predetermined distance from the wireless power connection terminal.

The wireless power coil comprises a first pattern unit formed on the top surface of the insulating sheet and a second pattern unit formed on the bottom surface of the insulating sheet and electrically connected to the first pattern unit.

In the wireless power antenna, current flows through the first pattern unit and the second pattern unit in the same direction to strengthen an intensity of the current, when viewed in front of the wireless power antenna.

The split pattern unit comprises a first split pattern unit included in the first pattern unit, and a second split pattern unit included in the second pattern unit and electrically connected to the first split pattern unit.

Patterns of the first split pattern unit and patterns of the second split pattern unit are disposed on same positions to be symmetrical to each other with respect to the insulating sheet.

Patterns of the first split pattern unit and patterns of the second split pattern unit are disposed at different positions in a zigzag fashion with respect to the insulating sheet.

Patterns of the split pattern unit comprise patterns having same widths and heights, having different widths, having different heights, or having different widths and heights.

The patterns are spaced the same distance from each other.

The widths of patterns of the split pattern unit are determined such that non-conducting regions are not generated in the patterns.

The widths of the patterns of the split pattern unit are determined to be twice or less than a surface thickness which current is capable of penetrating.

The split pattern unit comprises a main pattern and at least one sub-pattern.

At least one of a width and height of the main pattern exceeds a width or height of the at least one sub-pattern.

The split pattern unit comprises two or more sub-patterns having same widths and heights.

The split pattern unit comprises two or more sub-patterns having different widths, different heights, or different widths and heights.

To achieve these objects, the present invention provides a dual mode antenna comprising an insulating sheet, a near-field communication (NFC) coil provided on the insulating sheet to transmit and receive data and a wireless power coil provided on the insulating sheet to wirelessly transmit and receive power, and including a split pattern unit including a plurality of patterns spaced from each other in at least one region thereof in a widthwise direction.

The dual mode antenna further comprises a pair of wireless power connection terminals formed on one surface of the insulating sheet, and electrically connected to both ends of the wireless power coil, and wherein the split pattern unit is spaced a predetermined distance from the pair of wireless power connection terminals.

The split pattern unit is disposed on both a top surface and a bottom surface of the insulating sheet.

The split pattern unit comprises a first split pattern unit formed on the top surface of the insulating sheet and a second split pattern unit formed on the bottom surface of the insulating sheet and electrically connected to the first split pattern unit.

In the dual mode antenna, current flows through the first split pattern unit and the second split pattern unit in the same direction, when viewed in front of the dual mode antenna.

The first split pattern unit and the second split pattern unit are disposed on a same position to be symmetrical to each other with respect to the insulating sheet.

The patterns of the first split pattern unit and patterns of the second split pattern unit are disposed at different positions in a zigzag fashion with respect to the insulating sheet.

The widths of patterns of the split pattern unit are determined such that non-conducting regions are not generated in the patterns.

The widths of the patterns of the split pattern unit are determined to be twice or less a surface thickness which current is capable of penetrating.

The patterns of the split pattern unit comprise patterns having same widths and heights, different widths, different heights, or different widths and heights.

The split pattern unit comprises a main pattern and at least one sub-pattern.

At least one of a width and height of the main pattern exceeds a width or height of the at least one sub-pattern.

The split pattern unit comprises two or more sub-patterns having same widths and heights.

The split pattern unit comprises two or more sub-patterns having different widths, different heights, or different widths and heights.

DETAILED DESCRIPTION

Hereinafter, various exemplary embodiments of the present invention will be described in detail with reference to the accompanying drawings. First, a wireless power transmission system will be described and then a wireless power antenna according to the present invention will be described.

Figure 1:
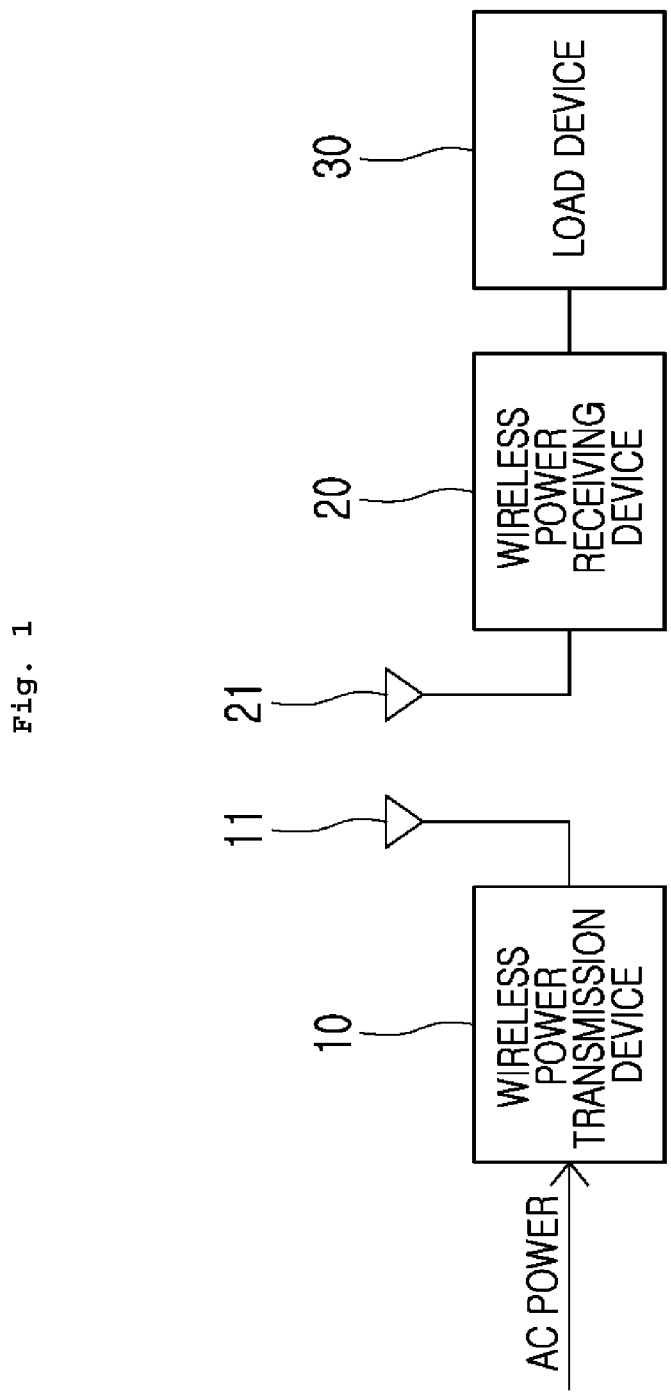
FIG. 1 is a schematic view of a structure of a wireless power transmission system according to an embodiment of the present invention.

FIG. 1 is a schematic view of a structure of a wireless power transmission system according to an embodiment of the present invention.

Referring to FIG. 1, the wireless power transmission system includes a wireless power transmission device (transmitter) 10 configured to wirelessly transmit power, and a wireless power receiving device (receiver) 20 configured to wirelessly receive power.

The wireless power transmission device 10 receives AC power from the outside and radiates an electromagnetic field to the outside via a power transmission antenna 11. In detail, the wireless power transmission device 10 rectifies AC power supplied from an external power supply into DC power through an AC/DC converter (not shown), converts the DC power into high-frequency AC power through a DC/AC converter (not shown) so as to wirelessly transmit the DC power, and transmits the high-frequency AC power to the wireless power receiving device 20 via the power transmission antenna 11.

The wireless power receiving device 20 may receive a power signal from the wireless power transmission device 10 via a power receiving antenna 21. In detail, a magnetic field is formed around the power transmission antenna 11 due to current flowing through the power transmission antenna 11 of the wireless power transmission device 10. A voltage may be induced to the power receiving antenna 21 of the wireless power receiving device 20 disposed adjacent to the magnetic field due to electromagnetic induction, thereby transmitting power. The wireless power receiving device 20 may charge a load device 30 such as a terminal or supply driving power for driving the wireless power receiving device 20 by using the transmitted power.

The wireless power transmission system has been described above with respect to a method of wirelessly transmitting power using magnetic induction. However, a wireless power antenna and/or a dual mode antenna which will be described below are not limited to magnetic induction, and the present invention is also applicable to, for example, wireless power antenna and/or a dual mode antenna employing magnetic resonance.

Hereinafter, wireless power antennae for wirelessly transmitting power according to various embodiments of the present invention will be described with reference to the accompanying drawings below.

Figure 2:
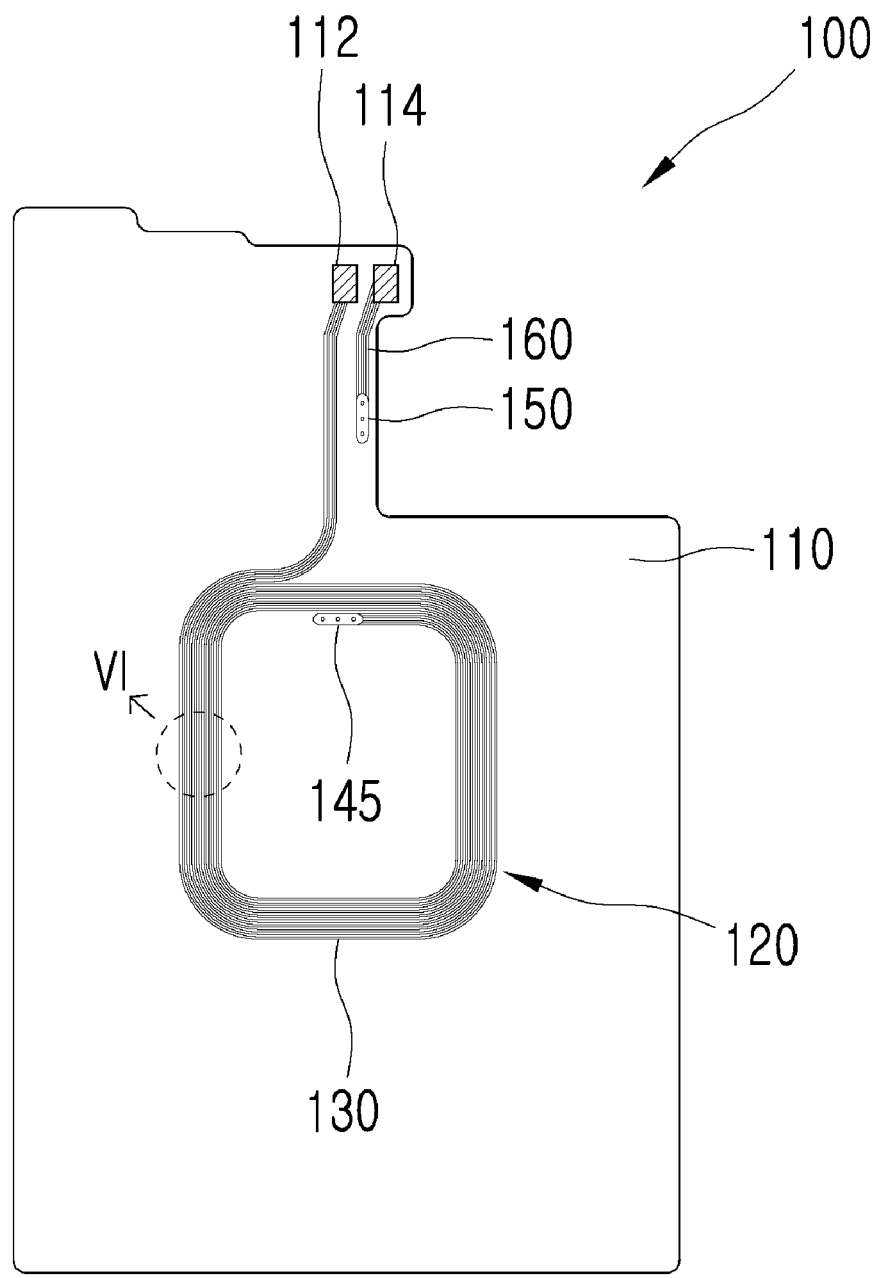
FIG. 2 is a front view of a wireless power antenna according to an embodiment of the present invention.
Figure 3:
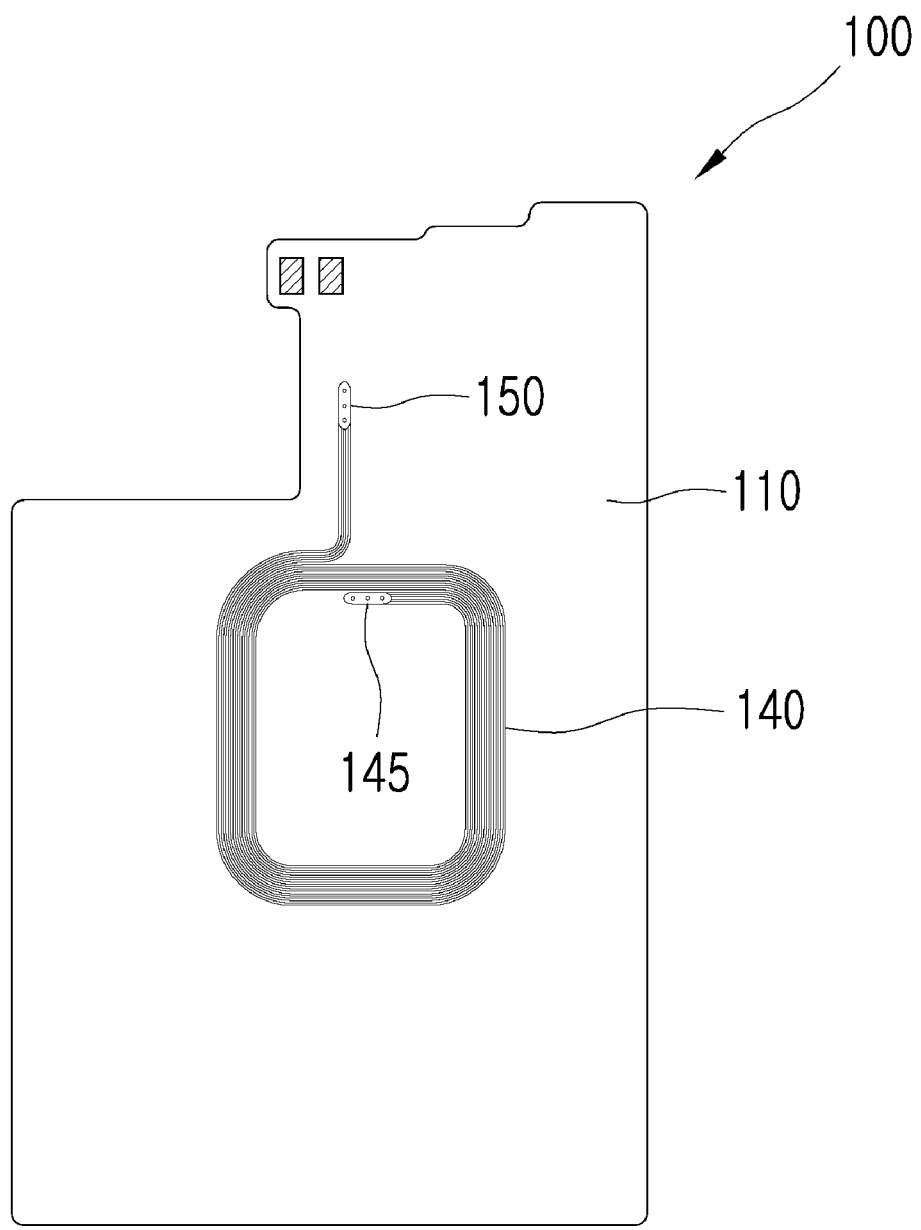
FIG. 3 is a rear view of FIG. 2.

FIG. 2 is a front view of a wireless power antenna 100 according to an embodiment of the present invention. FIG. 3 is a rear view of FIG. 2. The wireless power antenna 100 which will be described below is capable of wirelessly transmitting or receiving power and wirelessly relaying power. That is, the wireless power antenna 100 may perform all of a wireless power transmission antenna function, a wireless power receiving antenna function, and a wireless power relay antenna function.

Referring to FIGS. 2 and 3, the wireless power antenna 100 according to an embodiment of the present invention may include an insulating sheet 110.

The insulating sheet 110 provides a space on which a wireless power coil 120 which will be described below is installed. In general, the insulating sheet 110 is manufactured to be a printed circuit board (PCB) or a flexible PCB (FPCB).

A pair of wireless power connection terminals 112 and 114 may be formed on one surface of the insulating sheet 110 to be connected to both ends of the wireless power coil 120. When the wireless power antenna 100 according to an embodiment of the present invention is included in a device such as a terminal, the wireless power connection terminals 112 and 114 may be connected to module connection terminals (not shown) of the terminal so as to transmit power. Otherwise, the wireless power connection terminals 112 and 114 may be connected to connection terminals of a wireless power transmission device so as to wirelessly transmit power via the wireless power coil 120.

In the wireless power antenna 100 according to the present embodiment, a pattern of the wireless power coil 120 is formed on the insulating sheet 110. For example, the wireless power coil 120 has one end connected to one of the pair of wireless power connection terminals 112 and 114, a pattern in a loop shape wound on the insulating sheet 110, and another end connected to the other wireless power connection terminal 112 or 114.

In general, when the wireless power antenna 100 is used in a portable terminal or the like, the size of the insulating sheet 110 is very small and an area in which the pattern of the wireless power coil 120 is to be formed is also small. Thus, when the pattern of the wireless power coil 120 is formed on a top surface of the insulating sheet 110, a turn ratio required to wirelessly transmit and/or receive power may not be secured. Here, an impedance of the wireless power coil 120 is determined by a turn ratio thereof. A frequency region appropriate to wirelessly transmit and/or receive power may be covered by appropriately setting the impedance of the wireless power coil 120. Thus, securing an appropriate turn ratio of a coil means covering a frequency region appropriate to wirelessly transmit and/or receive power. Thus, when the wireless power coil 120 is formed only on the top surface of the insulating sheet 110, a necessary turn ratio is not secured and thus a frequency region appropriate to wirelessly transmit and/or receive power cannot be covered. Thus, the turn ratio should be additionally increased. To solve this problem, in the wireless power antenna 100 according to the present embodiment, the pattern of the wireless power coil 120 may be formed both on the top and bottom surfaces of the insulating sheet 110. That is, a turn ratio necessary to wirelessly transmit and/or receive power may be secured by forming the pattern of wireless power coil 120 on both the upper and bottom surfaces of the insulating sheet 110.

For example, the wireless power coil 120 may include a first pattern unit 130 and a second pattern unit 140 formed on the top and bottom surfaces of the insulating sheet 110, respectively. The first pattern unit 130 has one end connected to the wireless power connection terminal 112, and has a loop shape extending from the wireless power connection terminal 112 to converge from the top surface of the insulating sheet 110 to the inside thereof. Another end of the first pattern unit 130 formed on the top surface of the insulating sheet 110 is connected to the second pattern unit 140 formed on the bottom surface of the insulating sheet 110 via a current-carrying unit 145 passing through the insulating sheet 110 in the loop forming the pattern. The current-carrying unit 145 may be, for example, a via hole, etc.

The second pattern unit 140 has one end connected to the current-carrying unit 145 on the bottom surface of the insulating sheet 110, and has a pattern formed toward the outside from the inside of the loop while extending from the current-carrying unit 145. Another end of the second pattern unit 140 is connected to an extension pattern unit 160 on the top surface of the insulating sheet 110 via a via-hole 150, etc. to be connected to the wireless power connection unit 114.

The first and second pattern units 130 and 140 formed on the top and bottom surfaces of the insulating sheet 110 may form loops wound in the same direction when viewed in front of the wireless power antenna 100. That is, when current flows through the wireless power coil 120, the current may flow through the first and second pattern units 130 and 14 in the same direction when viewed in front of the wireless power antenna 100. As described above, when current flows through the first and second pattern units 130 and 140 of the wireless power coil 120, which are formed on both surfaces of the insulating sheet 110 while having the insulating sheet 110 therebetween, in the same direction, the current flowing through the first pattern unit 130 and the current flowing through the second pattern unit 140 strengthen each other, thereby improving the efficiency of wirelessly transmitting power.

When current flows through a conductor such as a coil, the current flows along a surface of a portion of an entire cross-section area of the conductor other than the entire cross-section area. This phenomenon is defined as so called "skin effect". The skin effect is a phenomenon that current flows only near a surface of a conductor such as a metal when high-frequency current is supplied to the conductor. The skin effect occurs when an induced electromagnetic force is generated in a conductor due to a sudden change in a direction of current flowing through the conductor and thus prevents the current from flowing into a central region of the conductor.

Figure 4:
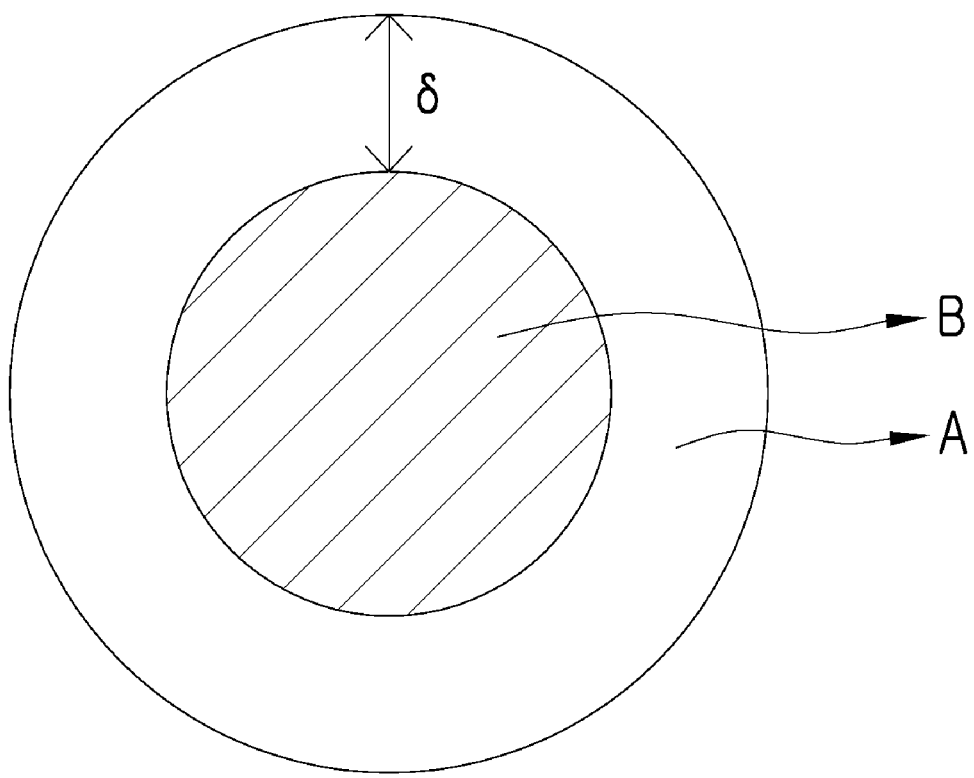
FIG. 4 is a schematic diagram for explaining the skin effect.

For example, as illustrated in FIG. 4, when current is conducted using one core wire, e.g., a coil having a single pattern unit, the current flows along a region A of a surface of a coil having a predetermined thickness δ and a non-conducting region B occurs in the coil due to the skin effect. Here, a skin thickness that permits current to penetrate and flows into the conductor may be expressed by Equation 1 below.

$$\delta = \sqrt{\frac{\rho}{\pi \times f \times \mu}} \quad \text{[Equation 1]}$$

Figure 5:
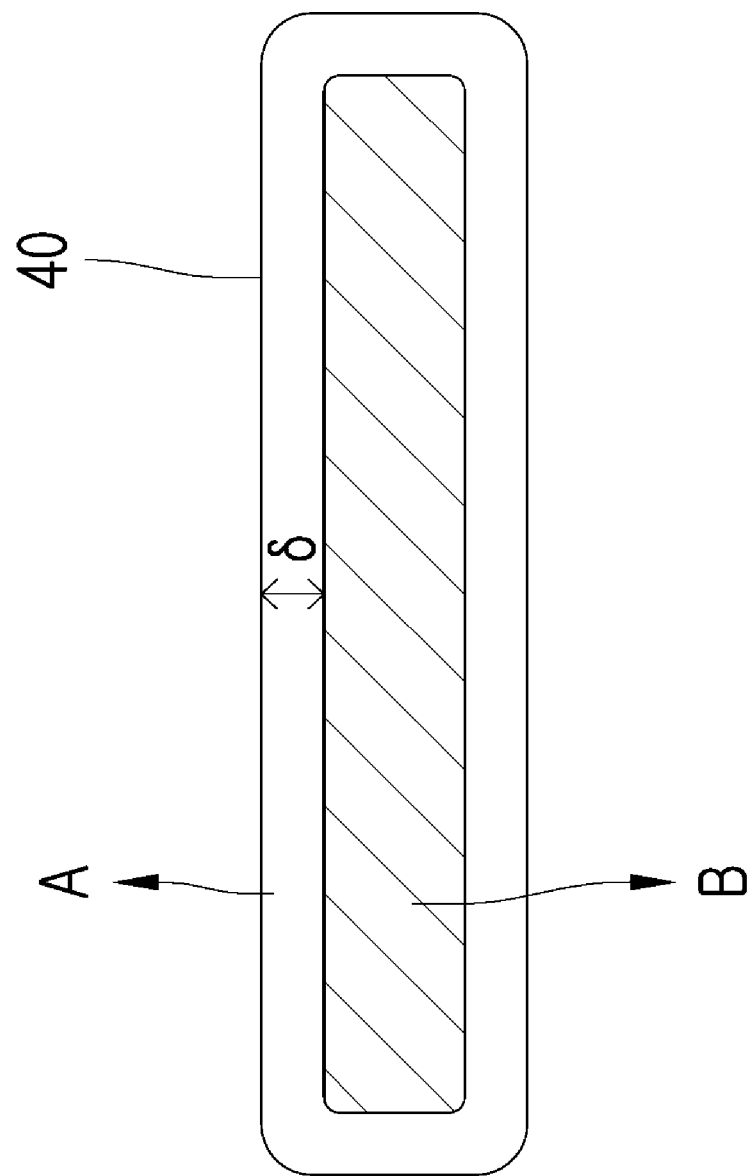
FIG. 5 is a cross-sectional view of a coil of a single pattern unit.

In Equation 1, "δ" denotes the skin thickness that permits current to penetrate and flows into the conductor, "f" denotes a frequency, "μ" denotes a permeability in a vacuum state, and "ρ" denotes the resistivity of the conductor. The skin effect limits an amount of current to flow through the coil, and greatly lowers the efficiency of wirelessly transmitting and receiving power. Thus, a quality factor Q is greatly lowered. Thus, when current flows along the inside of a single core wire, i.e., a coil 40 having a single pattern unit, as illustrated in FIG. 5, the current flows along the region A having the skin thickness δ determined by Equation 1 above, and the non-conducting region B through which no current flows is formed.

In the present embodiment, a split pattern unit 200 (see FIG. 6) may be formed in at least a region of the wireless power coil 120 to prevent the quality factor Q from being lowered due to the skin effect described above. For example, the wireless power coil 120 may be connected to the wireless power connection terminals 112 and 114 via one core wire, and include the split pattern unit 200 spaced a predetermined distance from the wireless power connection terminals 112 and 114. However, the present invention is not limited thereto, and the split pattern unit 200 may be directly connected to the wireless power connection terminals 112 and 114.

Figure 6:
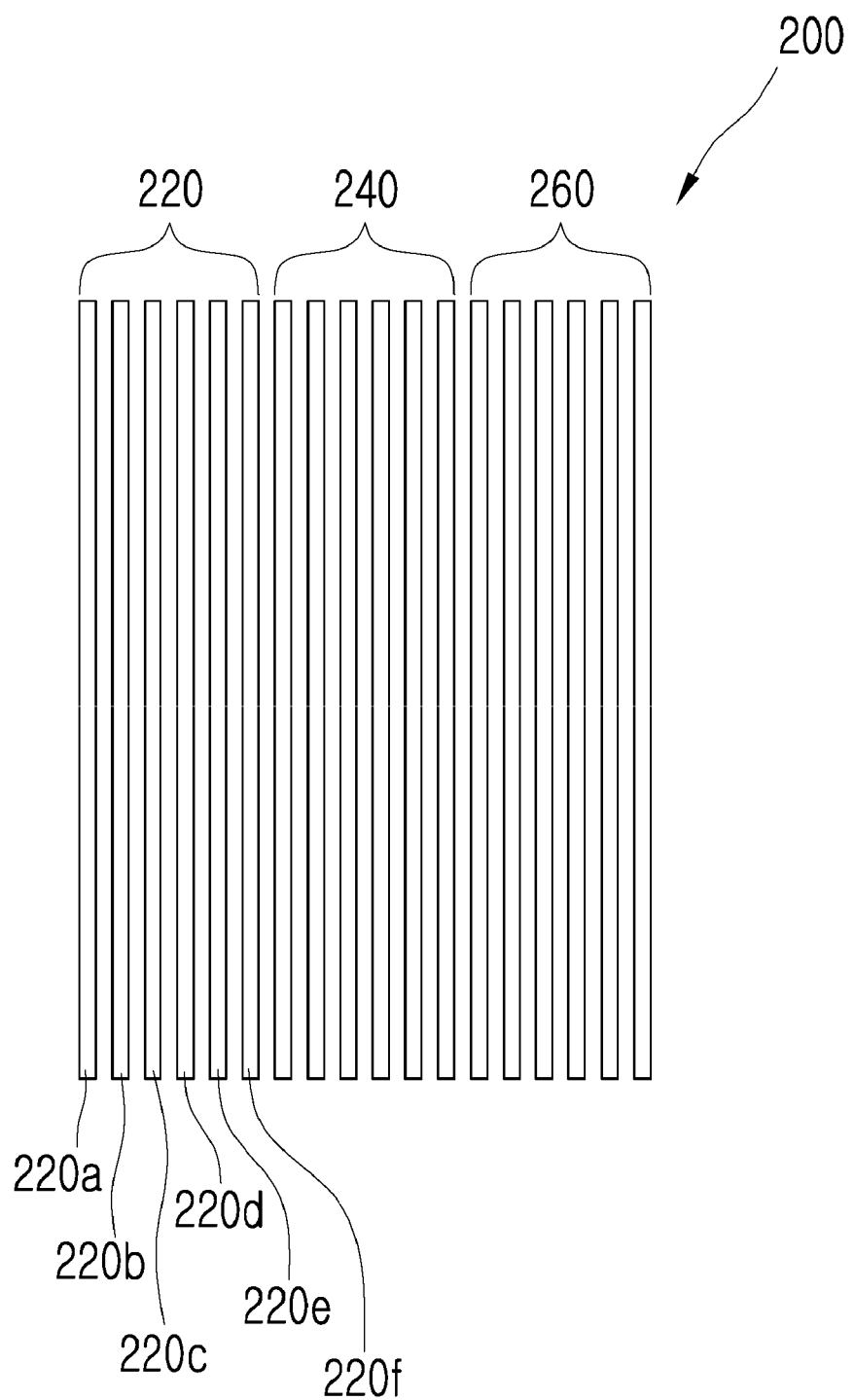
FIG. 6 is an expanded view of a region VI of FIG. 2.

The split pattern unit 200 includes a plurality of patterns 220 spaced from each other in a widthwise direction. FIG. 6 is an expanded view of a region VI of FIG. 2 to show the shape of the split pattern unit 200.

Referring to FIG. 6, the split pattern unit 200 is split into patterns 220a to 220f by dividing a core wire forming a pattern of a coil into a plurality of strands in a widthwise direction. In this case, the patterns 220a to 220f may be spaced the same distance from each other, and have the same width.

For example, referring to FIG. 6, the six patterns 220a to 220f may be defined as patterns split from one core wire. As described above, when a split pattern unit including a plurality of patterns is used instead of a single pattern unit including one core wire, a non-conducting region of a conductor may be reduced.

In the split pattern unit 200 including the patterns 220a to 220f, widths of the patterns 220a to 220f may be determined such that a non-conducting region is prevented from being generated in a conductor of the patterns 220a to 220f. A method of determining widths of patterns of a split pattern unit will be described with reference to the accompanying drawings below.

Figure 7:
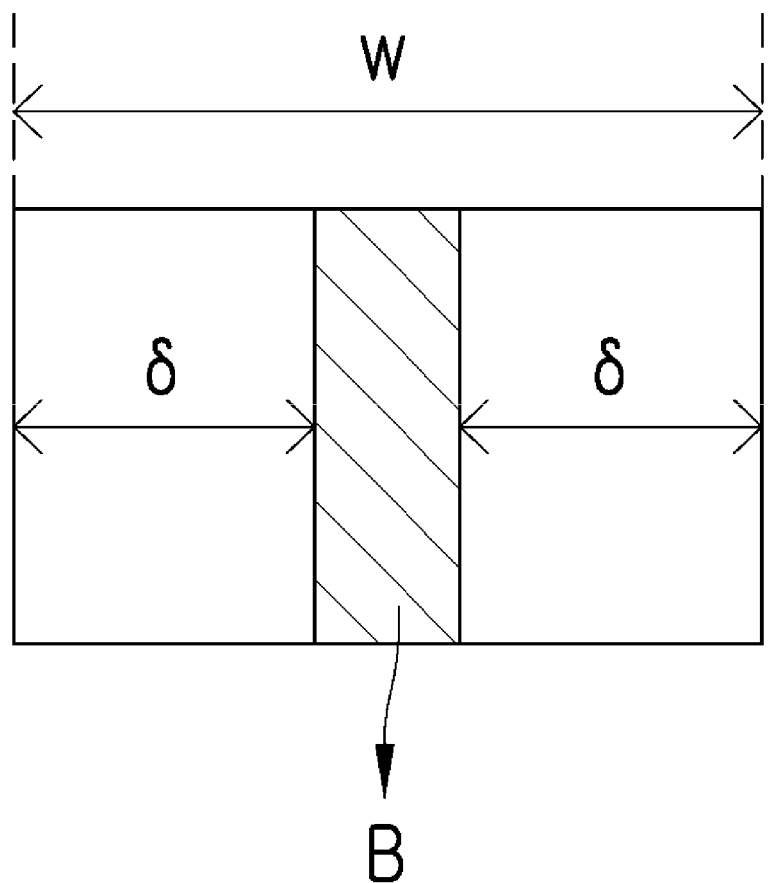
FIGS. 7 and 8 are schematic diagrams for determining widths of patterns of a split pattern unit.
Figure 8:
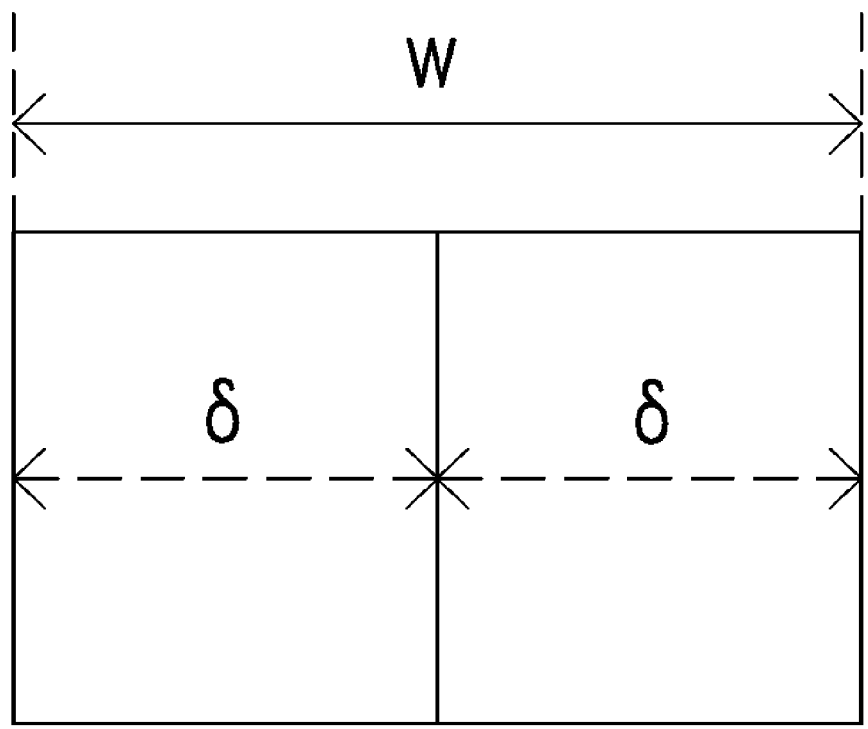

FIGS. 7 and 8 illustrate examples of a skin thickness of a coil which current may penetrate according to widths of patterns of a split pattern unit. The widths of the patterns of FIGS. 7 and 8 are set to be greater than the heights thereof, compared to the pattern of FIG. 5. As described above, when the height of a pattern is less than the width thereof, the skin effect occurs on both sides of a conductor in a widthwise direction. That is, regions which current may penetrate and flow through may be generated at both sides of the conductor toward the inside of the conductor. When the width of the conductor is greater than the height thereof, the width of the conductor may be determined by a skin thickness thereof to prevent a non-conducting region from being generated, as will be described in detail below.

As illustrated in FIG. 7, the non-conducting region B into which current does not flow is generated when a width W of each of the patterns is determined to exceed the double of the skin thickness δ which current may penetrate. However, as illustrated in FIG. 8, the non-conducting region B into which current does not flow is not generated when the width W of each of the patterns is determined to be less than or equal to the double of the skin thickness δ which current may penetrate. Thus, in the present embodiment, the width W of each of the patterns is determined such that a non-conducting region caused by the skin effect is not generated in the coil. For example, the width W of each of the patterns may be determined to be less than or equal to the double of the skin thickness δ. The width W of each of the patterns may be expressed by Equation 2 below.

$$W \leq 2\delta = 2 \times \sqrt{\frac{\rho}{\pi \times f \times \mu}} \quad \text{[Equation 2]}$$

For example, the applicant of the present application conducted an experiment and concluded that a split pattern unit may include two to eight patterns having a width of about 0.10 mm to 0.20 mm and spaced by about 0.05 mm to 0.1 mm from each other. Here, when the split pattern unit includes nine or more patterns, DC resistance components may increase to lower the efficiency of wirelessly transmitting and receiving power.

A split pattern unit as described above may include a first split pattern unit 220 (see FIG. 9) included in the first pattern unit 130 on the top surface of the insulating sheet 110, and a second split pattern unit 220' (see FIG. 9) included in the second pattern unit 140 on the bottom surface of the insulating sheet 110. That is, when the wireless power coil 120 is formed on both the top and bottom surfaces of the insulating sheet 110, a split pattern unit may be also formed on both the top and bottom surfaces of the insulating sheet 110. In this case, current flows through patterns of the split pattern unit in the same direction to increase the intensity of the current and the first and second split pattern units 220 and 220' are connected through a current-carrying unit as described above in the previous embodiments. Thus, the above structures are not redundantly described again here.

Figure 9:
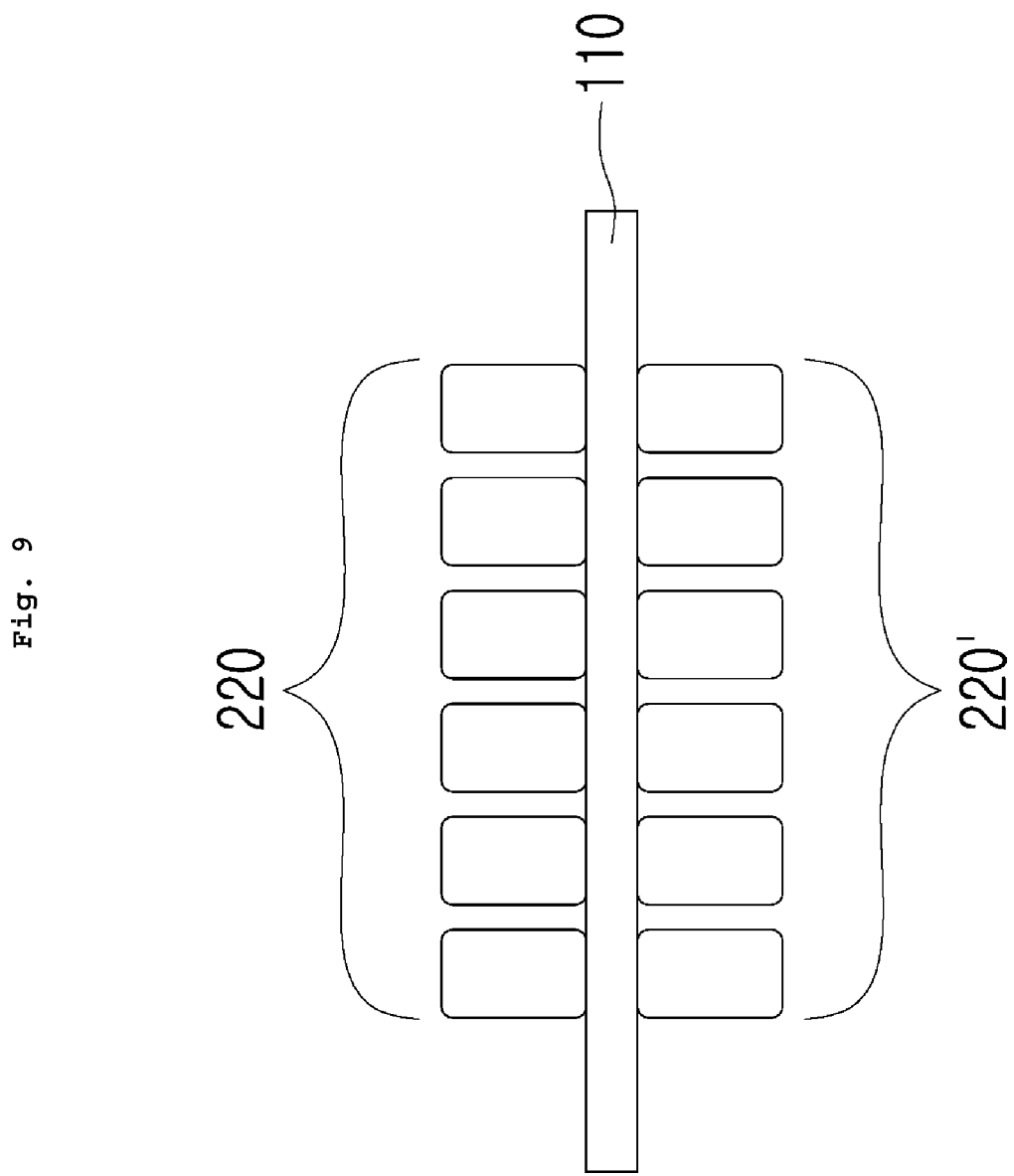
FIGS. 9 and 10 are side views illustrating arrangements of a first split pattern unit and a second split pattern unit.
Figure 10:
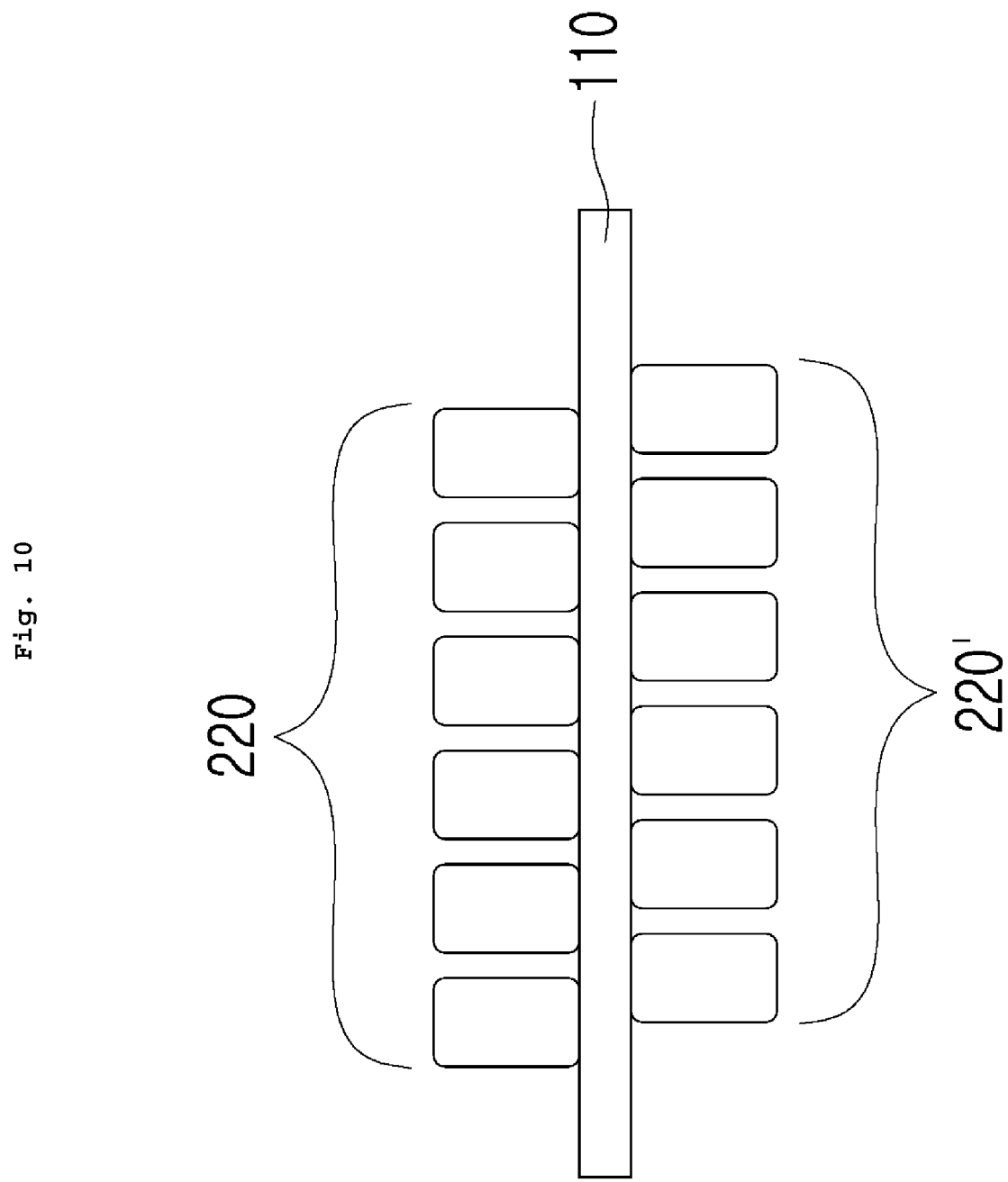

FIGS. 9 and 10 illustrate cases in which a split pattern unit is formed on both top and bottom surfaces of an insulating sheet 110 according to various embodiments of the present invention.

Referring to FIG. 9, a first split pattern unit 220 and a second split pattern unit 220' may be disposed on top and bottom surfaces of the insulating sheet 110 to be in phase with each other. That is, patterns of the first split pattern unit 220 and patterns of the second split pattern unit 220' are disposed at same positions to be symmetrical to each other while having the insulating sheet 110 therebetween.

Referring to FIG. 10, a first split pattern unit 220 and a second split pattern unit 220' may be disposed on top and bottom surfaces of the insulating sheet 110 in a zigzag fashion to be out of phase with each other. That is, patterns of the first split pattern unit 220 and patterns of the second split pattern unit 220' are disposed at different positions in a zigzag fashion while having the insulating sheet 110 therebetween.

In the embodiments of FIGS. 9 and 10, patterns of a split pattern unit have the same height and width and may be thus defined as an 'equally split pattern type'. However, the split pattern unit may be 'non-equally split pattern type'. The 'non-equally split pattern type' may be defined that widths and/or heights of the patterns of the split pattern unit are different from each other. A split pattern unit of non-equally split pattern type may be formed on the top and bottom surfaces of the insulating sheet 110 as in the previous embodiments.

Figure 11:
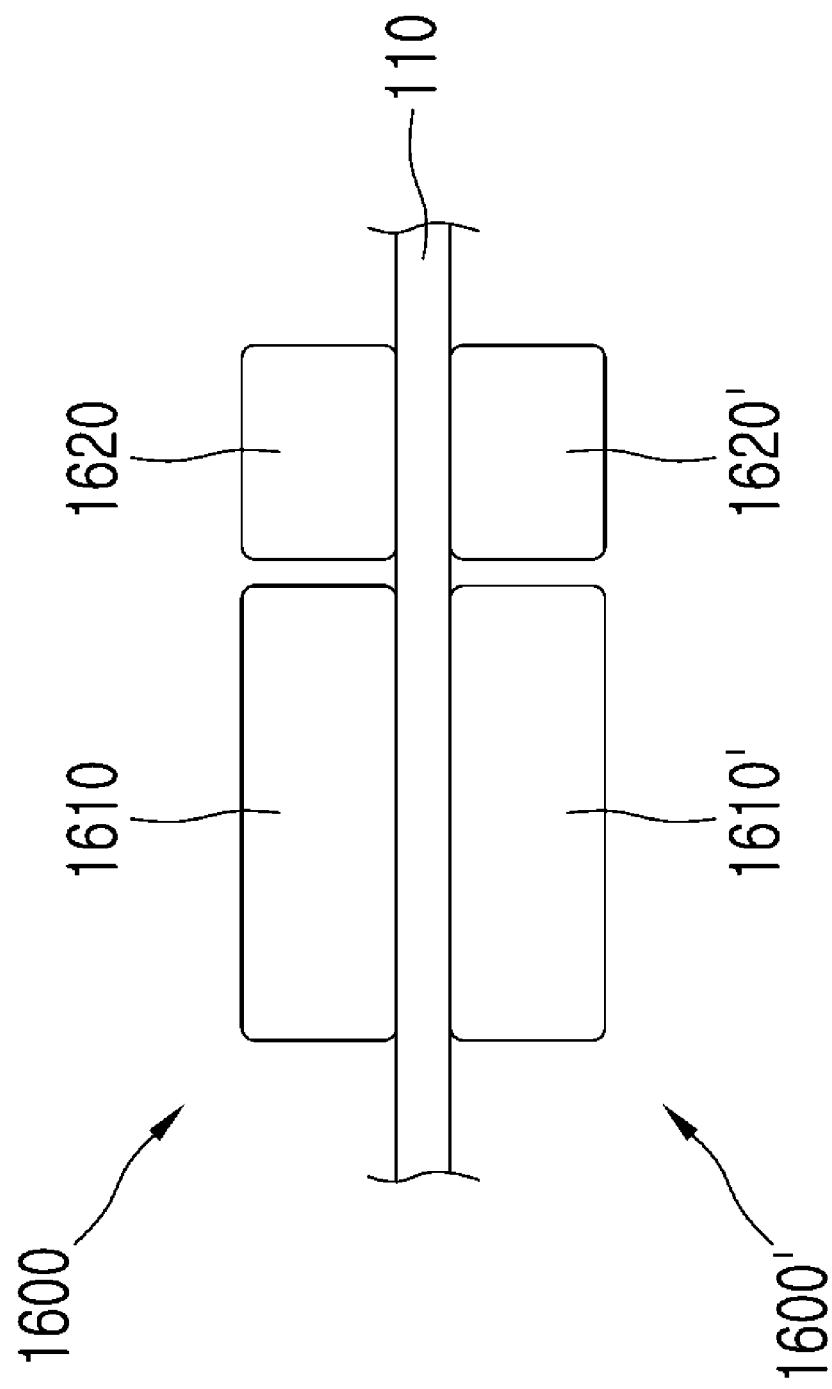
FIGS. 11 to 18 are side views of split pattern units according to other embodiments of the present invention.

FIG. 11 is a cross-sectional view of a split pattern unit of non-equally split pattern type according to an embodiment of the present invention.

Referring to FIG. 11, the split pattern unit may include at least two patterns, e.g., two to eight patterns. FIG. 11 illustrates a case in which a split pattern unit includes two patterns.

The split pattern unit may include a first split pattern unit 1600 and a second split pattern unit 1600' formed on top and bottom surfaces of an insulating sheet 110, respectively.

In this case, the first split pattern unit 1600 may include a main pattern 1610 and at least one sub-pattern 1620, and the second split pattern unit 1600' may include a main pattern 1610' and at least one sub-pattern 1620'. In this case, widths and/or heights of the main patterns 1610 and 1610' may be set to exceed the widths and/or heights of the sub-patterns 1620 and 1620'. Although FIG. 11 illustrates that the widths of the main patterns 1610 and 1610' are greater than those of the sub-patterns 1620 and 1620', the present invention is not limited thereto, and the heights of the main patterns 1610 and 1610' may be greater than those of the sub-patterns 1620 and 1620' or both the widths and heights of the main patterns 1610 and 1610' may be greater than those of the sub-patterns 1620 and 1620'.

The patterns of the first split pattern unit 1600 and the patterns of the second split pattern unit 1600' may be disposed at same positions or different positions with respect to the insulating sheet 110.

For example, FIG. 11 illustrates a case in which the patterns of the first split pattern unit 1600 and the patterns of the second split pattern unit 1600' are disposed at same positions with respect to the insulating sheet 110. That is, the main pattern 1610' of the second split pattern unit 1600' is disposed under the main pattern 1610 of the first split pattern unit 1600 and the sub-pattern 1620' of the second split pattern unit 1600' is disposed under the sub-pattern 1620 of the first split pattern unit 1600 with respect to the insulating sheet 110.

Figure 12:
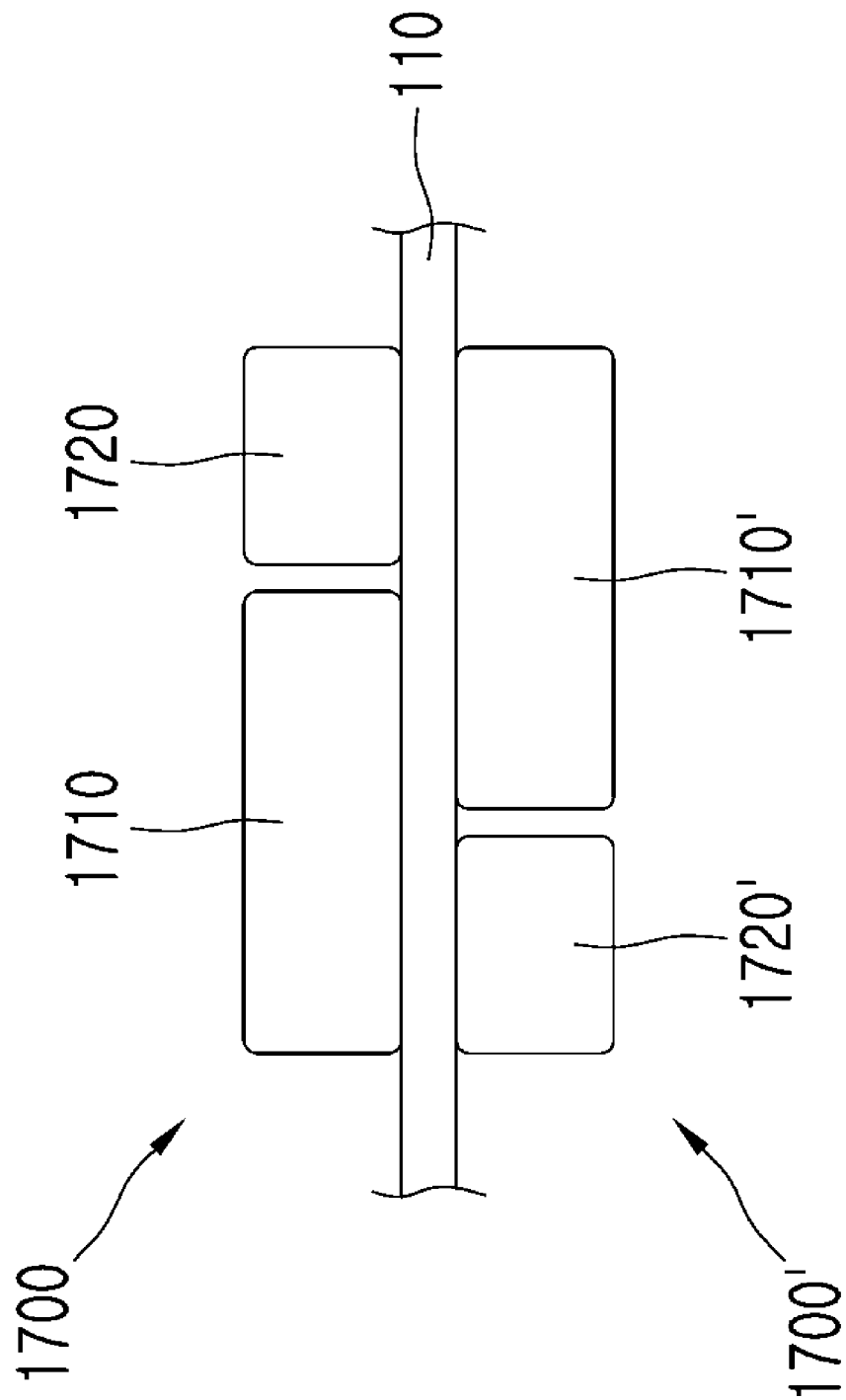

FIG. 12 illustrates a case in which patterns of a first split pattern unit and patterns of a second split pattern unit are disposed at different positions, compared to the case of FIG. 11.

Referring to FIG. 12, a sub-pattern 1720' of a second split pattern unit 1700' is disposed under a main pattern 1710 of a first split pattern unit 1700 and a main pattern 1710' of a second split pattern unit 1700' is disposed under a sub-pattern 1720 of a first split pattern unit 1700 with respect to an insulating sheet 110.

In a split pattern unit as described above, one sub-pattern or a plurality of sub-patterns may be included. A case in which a plurality of sub-patterns are included in a split pattern unit will be described below.

Figure 13:
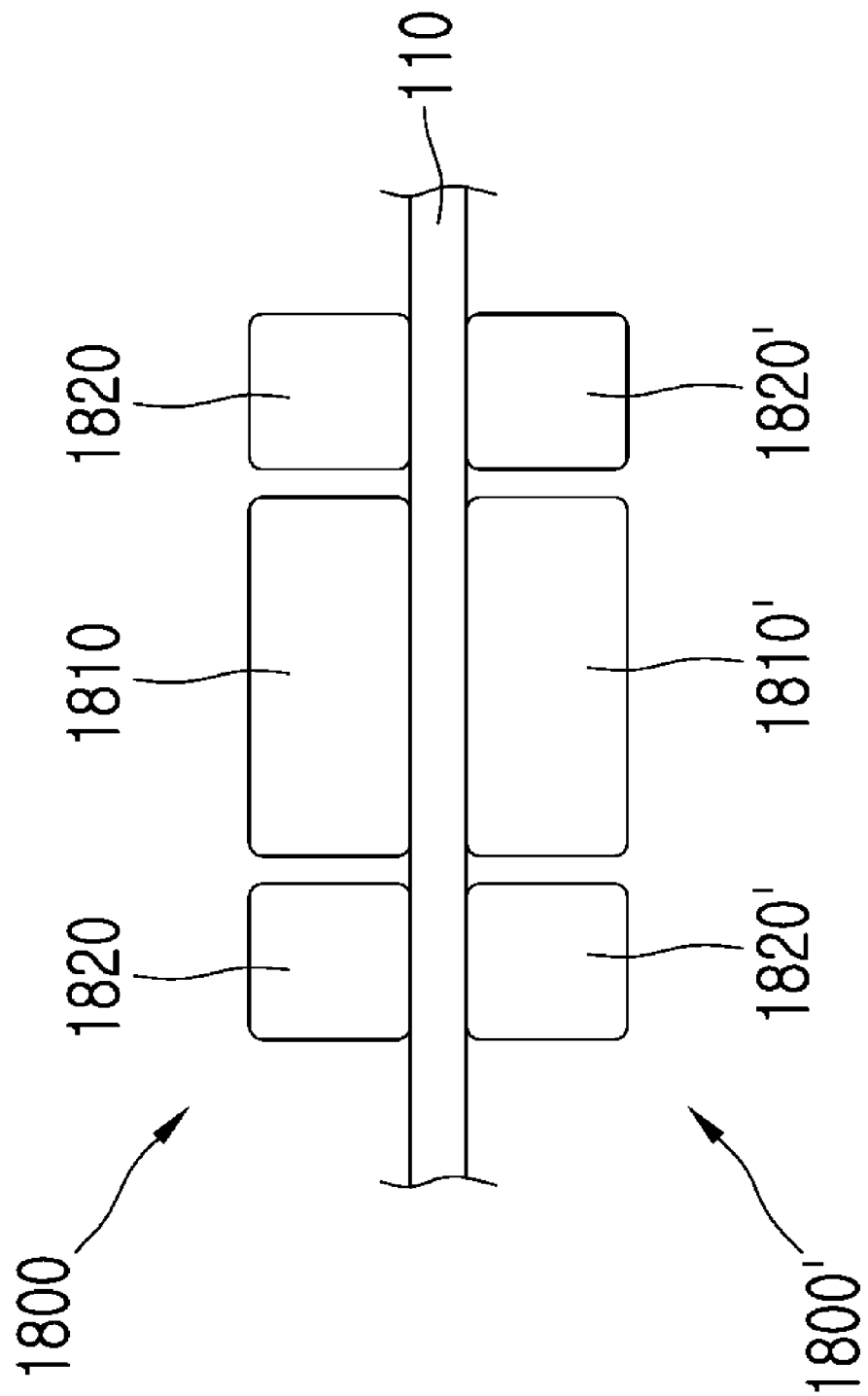

FIG. 13 illustrates a split pattern unit including two sub-patterns.

Referring to FIG. 13, a first split pattern unit 1800 includes a main pattern 1810 and two sub-patterns 1820. In this case, the sub-patterns 1820 may have same widths and heights. That is, one of the width and height of the main pattern 1810 is greater than the other width or height thereof, but the widths and heights of the two sub-patterns 1820 may be the same.

A main pattern 1810' and sub-patterns 1820' of a second split pattern unit 1800' formed on a bottom surface of the insulating sheet 110 may have the same structures as the main pattern 1810 and the two sub-patterns 1820. FIG. 13 illustrates that the patterns of the first split pattern unit 1800 and the patterns of the second split pattern unit 1800' are disposed at same positions.

Figure 14:
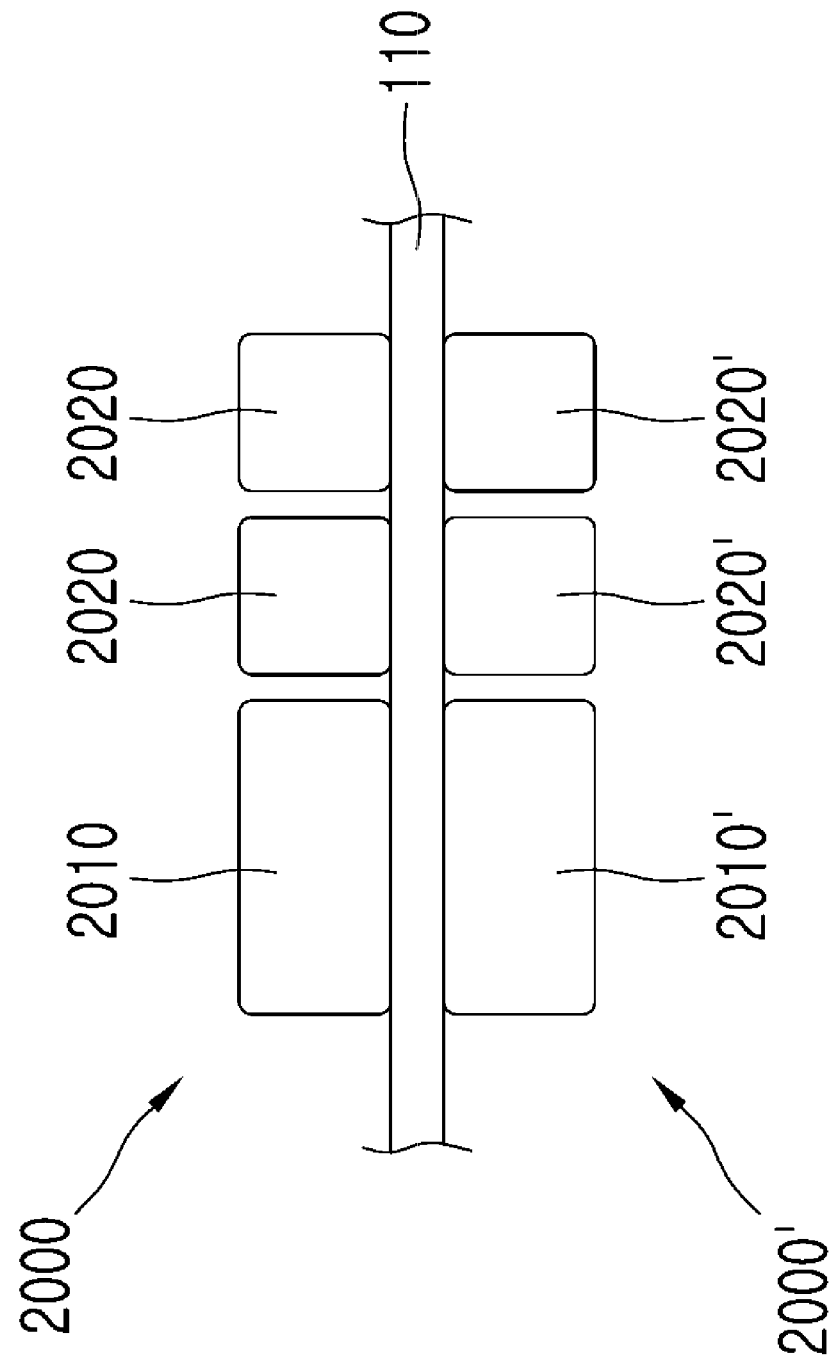

FIG. 14 illustrates a case in which relative positions of a main pattern and a sub-pattern are switched to each other, compared to the case of FIG. 13. That is, FIG. 13 illustrates that a main pattern is disposed between a pair of sub-patterns but a main pattern is disposed on one side of an insulating sheet 110 and sub-patterns are disposed on another side of the insulating sheet 110 in the present embodiment.

Referring to FIG. 14, a main pattern 2010 of a first split pattern unit 2000 is disposed on one side of an insulating sheet 110 and sub-patterns 2020 are disposed on another side of the insulating sheet 110. A main pattern 2010' and sub-patterns 2020' of a second split pattern unit 2000' formed on a bottom surface of the insulating sheet 110 are disposed on the same positions as the main pattern 2010 and the sub-patterns 2020 of the first split pattern unit 2000.

Figure 15:
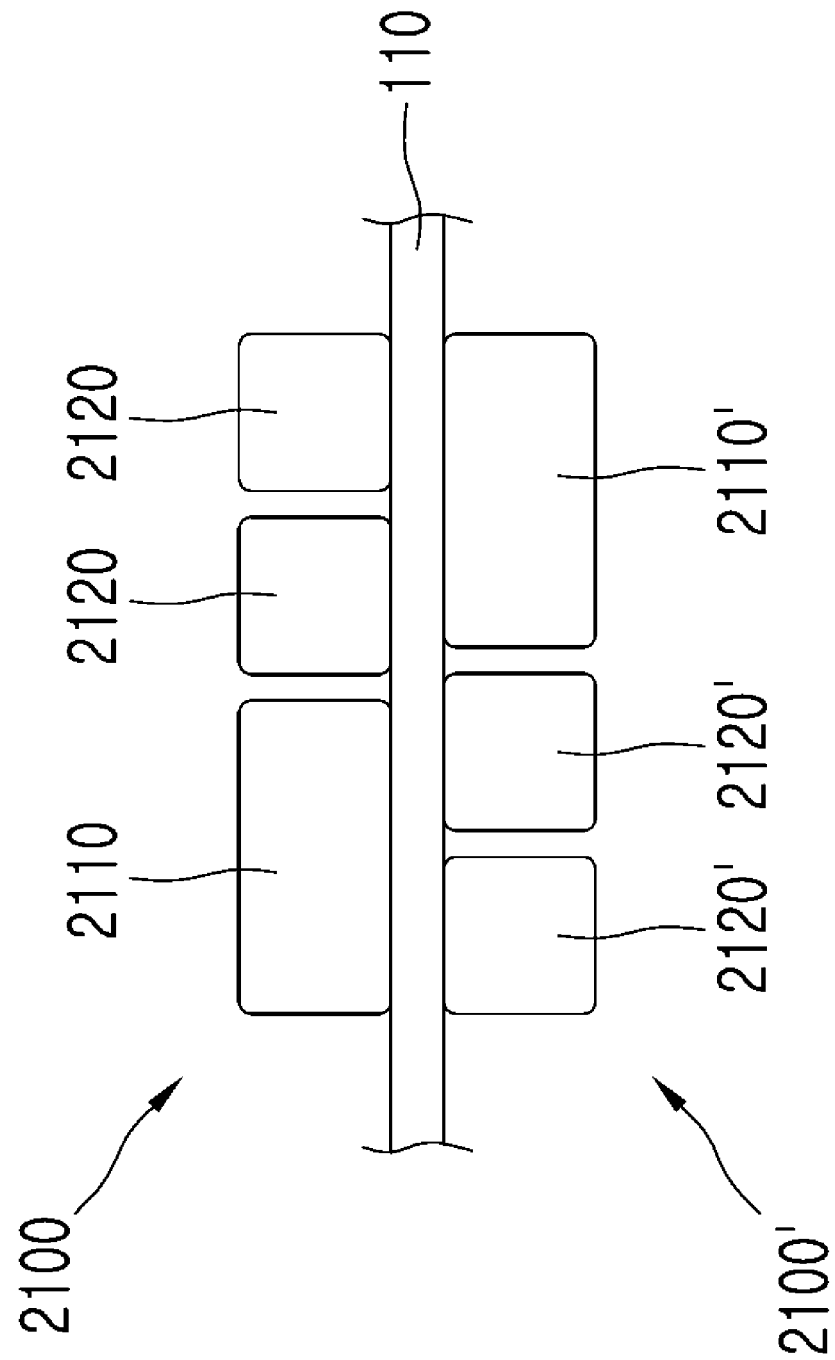

FIG. 15 illustrates a case in which patterns of a first second split pattern unit and patterns of a second split pattern unit are disposed at different positions when the first and second split pattern units each include two sub-patterns.

Referring to FIG. 15, sub-patterns 2120' of a second split pattern unit 2100' are disposed under a main pattern 2110 of a first split pattern unit 2100 and a main pattern 2110' of the second split pattern unit 2100' is disposed under sub-patterns 2120 of the first split pattern unit 2100 with respect to an insulating sheet 110.

Although cases in which when two or more sub-patterns are prepared, the heights and widths of the two or more sub-patterns are the same have been described in the previous embodiments, widths and/or heights of sub-patterns may be different from one another, as will be described with reference to the accompanying drawings below.

Figure 16:
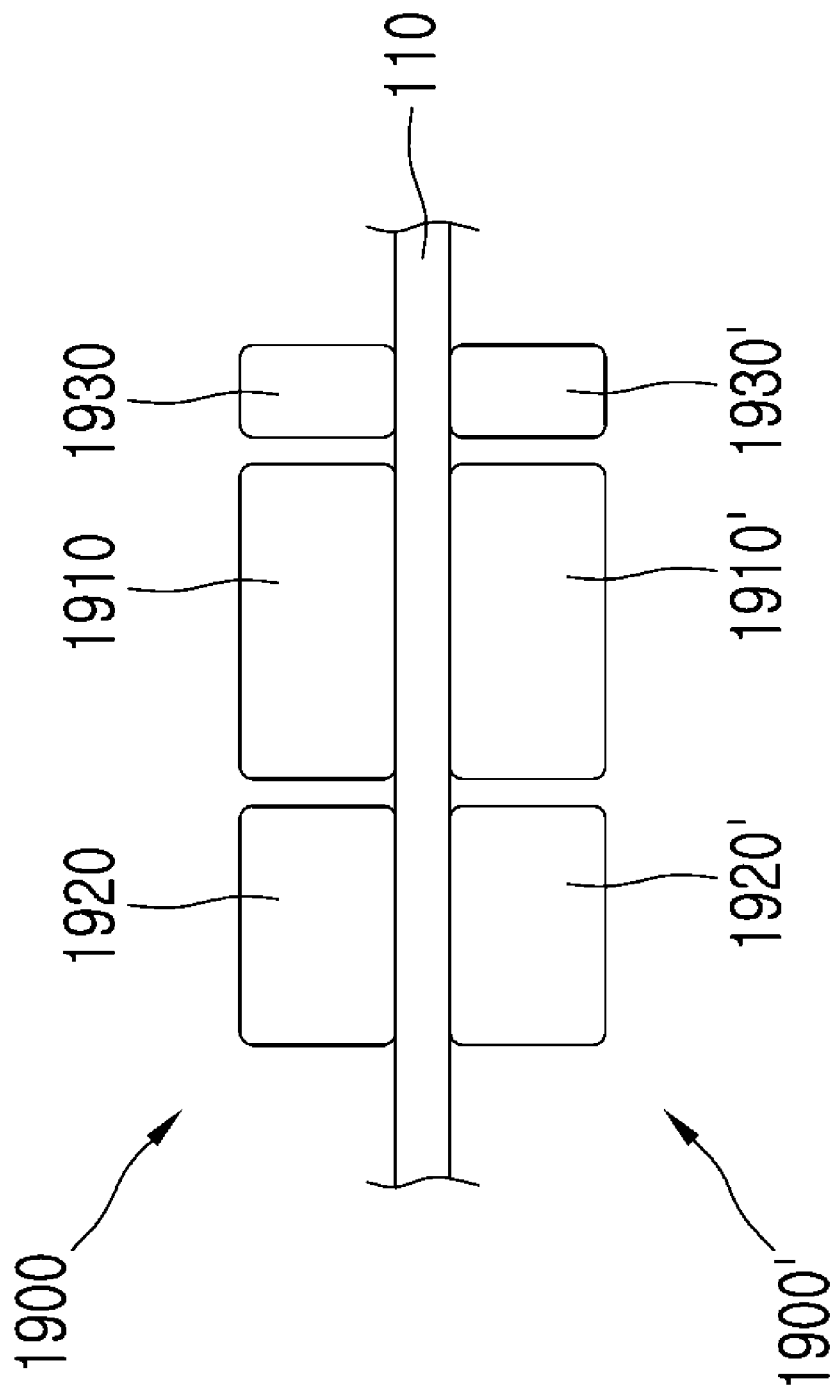

FIG. 16 illustrates a case in which when a main pattern and two or more sub-patterns are prepared, heights and/or widths of the sub-patterns are different from one another.

Referring to FIG. 16, a first split pattern unit 1900 includes a main pattern 1910 and two sub-patterns 1920 and 1930. In this case, heights and/or widths of the sub-patterns 1920 and 1930 are different from one another. For example, the width of the first sub-pattern 1920 is greater than that of the second sub-pattern 1930. Alternatively, the height of the first sub-pattern 1920 may be greater than that of the second sub-pattern 1930 or both the height and width of the first sub-pattern 1920 may be greater than those of the second sub-pattern 1930.

Referring to FIG. 16, the main pattern 1910 is disposed on a center of an insulating sheet 110, and the sub-patterns 1920 and 1930 are disposed at both sides of the main pattern 1920. Although FIG. 16 illustrates that the first sub-pattern 1920 is disposed at a left side of the main pattern 1910 and the second sub-pattern 1930 is disposed at a right side of the main pattern 1910, the present invention is not limited thereto. The first sub-pattern 1920 may be disposed at the right side of the main pattern 1910 and the second sub-pattern 1930 may be disposed at the left side of the main pattern 1910. A main pattern 1910' and sub-patterns 1920' and 1930' of a second split pattern unit 1900' may be disposed on the same positions as the main pattern 1910 and the sub-patterns 1920 and 1930 of the first split pattern unit 1900.

Figure 17:
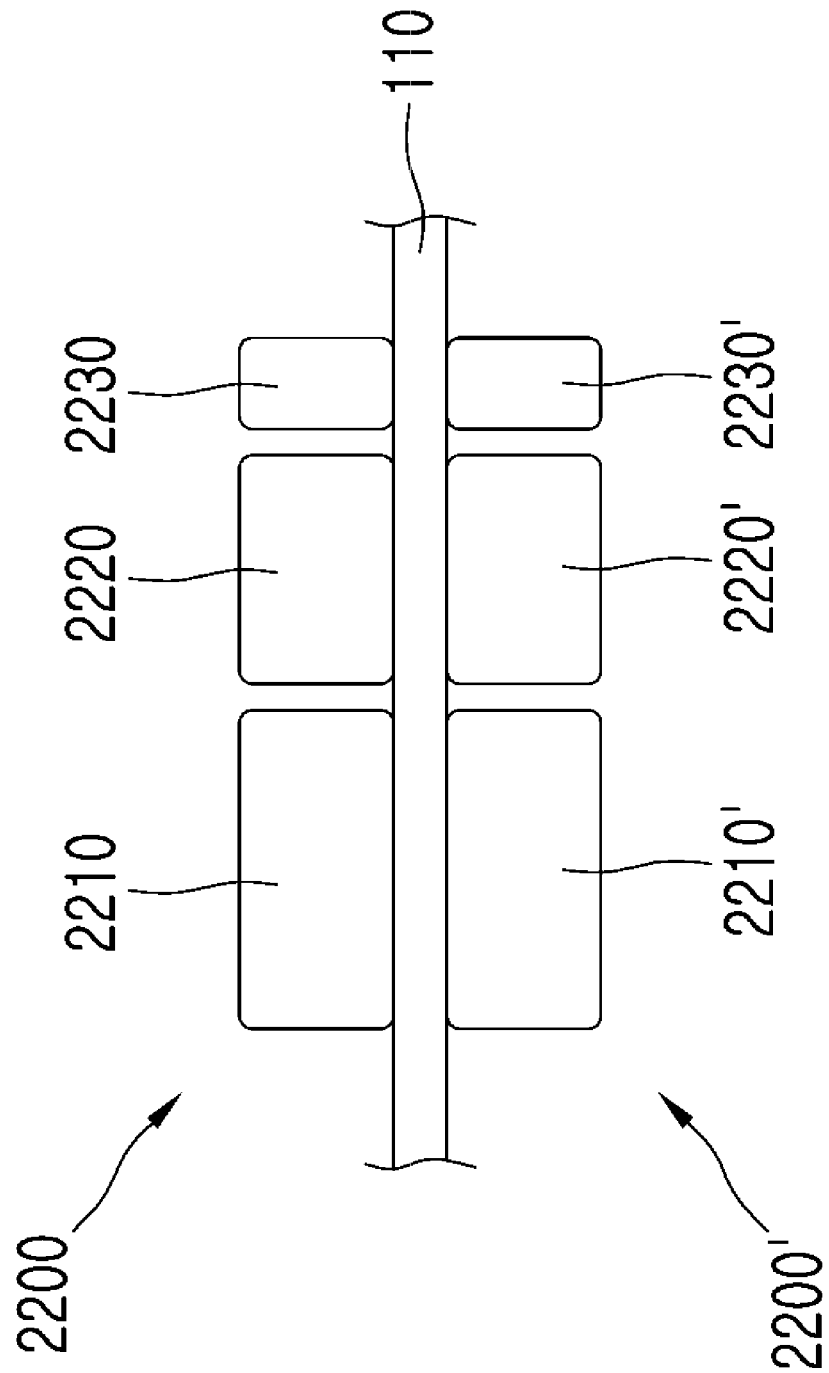

FIG. 17 illustrates a case in which relative positions of a main pattern and a sub-pattern are switched to each other, compared to the case of FIG. 16. That is, FIG. 16 illustrates that a main pattern is disposed between a pair of sub-patterns, but a main pattern is disposed on one side of an insulating sheet and sub-patterns are disposed on another side of the insulating sheet in the present embodiment.

Referring to FIG. 17, a main pattern 2210 of a first split pattern unit 2200 is disposed on a side of an insulating sheet 110 and a pair of sub-patterns 2220 and 2230 are disposed on another side of the insulating sheet 110. A main pattern 2210' and sub-patterns 2220' and 2230' of a second split pattern unit 2200' formed on a bottom surface of the insulating sheet 110 are disposed on same positions as the main pattern 2210 and the sub-patterns 2220 and 2230 of the first split pattern unit 2200. The widths and/or heights of these sub-patterns are different from one another as described above.

Figure 18:
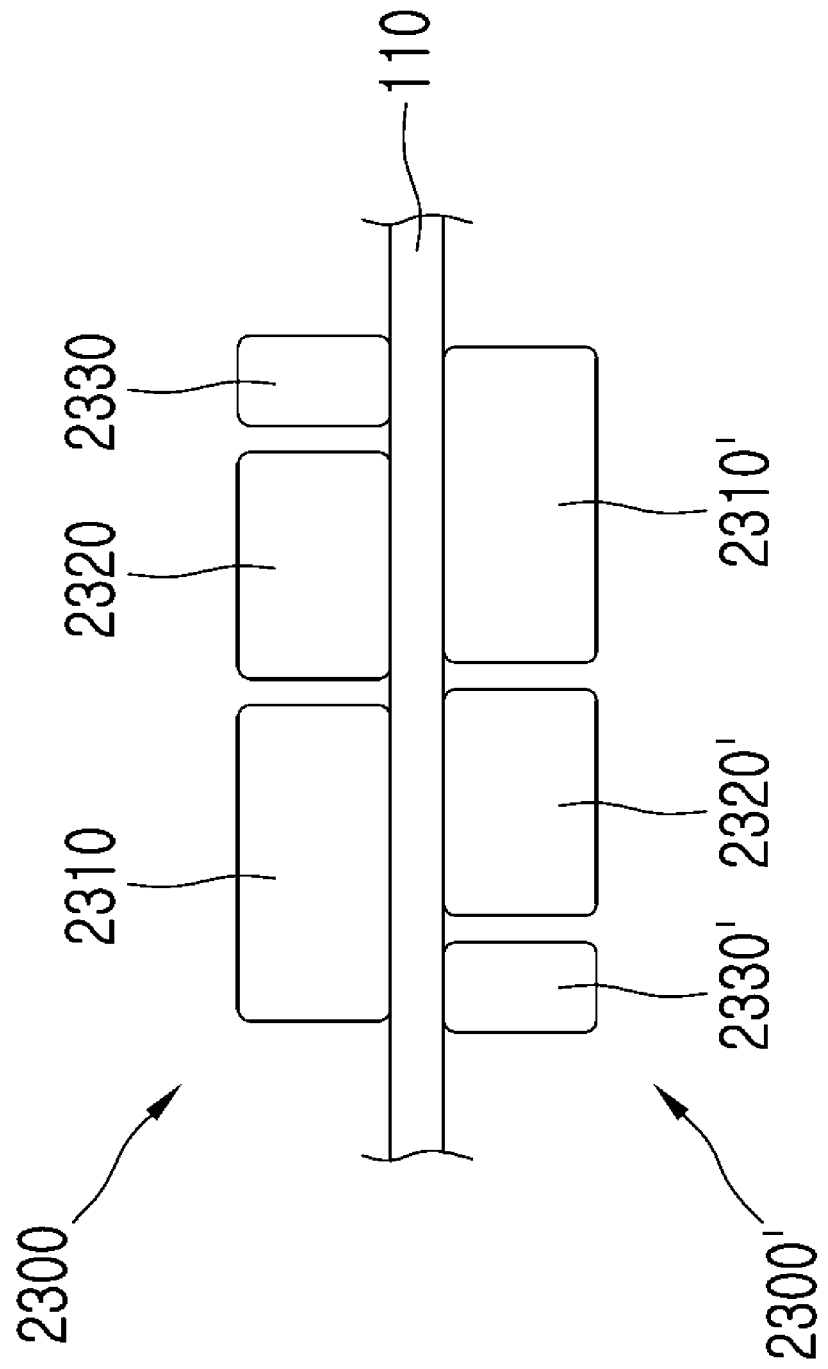

FIG. 18 illustrates a case in which when two sub-patterns are prepared, patterns of a first split pattern unit and patterns of a second split pattern unit are disposed at different positions.

Referring to FIG. 18, sub-patterns 2320' and 2330' of a second split pattern unit 2300' are disposed under a main pattern 2310 of a first split pattern unit 2300 and a main pattern 2310' of the second split pattern unit 2300' is disposed under sub-patterns 2320 and 2330 of a first split pattern unit 2300 with respect to an insulating sheet 110. Although FIG. 18 illustrates that in the first split pattern unit 2300, the main pattern 2310 is disposed on a side of the insulating sheet 110 and the first sub-pattern 2320 and the second sub-pattern 2330 are sequentially disposed adjacent to the main pattern 2310, the present invention is not limited. The main pattern 2310, the second sub-pattern 2330, and the first sub-pattern 2320 may be sequentially disposed. Similarly, in the second split pattern unit 2300', the order in which the sub-patterns 2320' and 2330' are disposed may be changed.

Although cases in which one main pattern and two sub-patterns are prepared have been described in the previous embodiments of FIGS. 13 to 18, the present invention is not limited thereto and is also applicable to a case in which three or more sub-patterns are prepared.

In wireless power antennae according to various embodiments of the present invention as described above, a quality factor Q of a conductor may be defined by Equation 3 below.

$$Q = \omega \frac{L}{R} \qquad \text{[Equation 3]}$$

In Equation 3, "ω" denotes a frequency, "L" denotes an inductance of the conductor, and "R" denotes a resistance of the conductor. According to an experiment conducted by the applicant of the present application, the resistances R, inductances L, and quality factors Q of a coil including a single pattern unit and a coil including a split pattern unit according to the present invention were as shown in Table 1 below.

TABLE 1

|  | R (mohm) | L (uH) | Q |
|---|---|---|---|
| Single pattern unit | 610 | 6.20 | 6.23 |
| Complex pattern unit (equally split pattern type) | 739 | 8.30 | 7.07 |

In the experiment, for example, the resistances R, inductances L, and quality factors Q of a coil including a single pattern unit and having five turns and a coil including a complex pattern unit of equally split pattern type and having five turns were compared. As shown in Table 1 above, although the resistance R and inductances L of the coil including the complex pattern unit were higher than those of the coil including the single pattern unit, the quality factor Q of the complex pattern unit was 7.07 which was higher by about 14% than the quality factor Q of the single pattern unit which was 6.23 when the quality factors Q were calculated by Equation 3 above. Since the complex pattern unit had the higher quality factor Q, the efficiency of wirelessly transmitting power using the complex pattern unit was 61.7% which was higher by about 4% than 65.8% which was the efficiency of wirelessly transmitting power using the single pattern unit.

Furthermore, the applicant of the present application conducted an experiment comparing the resistances R, inductances L, and quality factors Q of a coil including a single pattern unit, a coil including a split pattern unit of an equally split pattern type, and a coil including a split pattern unit of a non-equally split pattern type. A result of conducting the experiment was as shown in Table 2 below.

TABLE 2

|  | R (mohm) | L (uH) | Q |
|---|---|---|---|
| Single pattern unit | 627 | 6.5 | 6.5 |
| Complex pattern unit | 708 | 7.19 | 6.39 |

TABLE 2-continued

|  | R (mohm) | L (uH) | Q |
| --- | --- | --- | --- |
| (equally split pattern type) Complex pattern unit (non-equally split pattern type) | 496 | 7.78 | 9.9 |

In the experiment, for example, the resistances R, inductances L, and quality factors Q of a coil including a complex pattern unit of an equally split pattern type and having six turns, a coil including a complex pattern unit of a non-equally split pattern type and having six turns, and a coil including a single pattern unit and having five turns were compared. As shown in Table 2 above, both the inductances L of the coils including the complex patterns were higher than that of the coil including the single pattern unit. The inductance L of the coil including the complex pattern unit of the equally split pattern type was 7.19 which was higher by about 10.6% than that of the coil including the single pattern unit, and the inductance L of the coil including the complex pattern unit of the non-equally split pattern type was 7.78 which was higher by about 20% than that of the coil including the single pattern unit. The resistance R of the coil including the complex pattern unit of the non-equally split pattern type was 496 which was lower by about 21% than that of the coil including the single pattern unit. In contrast, the resistance R of the coil including the complex pattern unit of the equally split pattern type was 708 which was slightly higher than that of the coil including the single pattern unit.

The quality factor Q of the coil including the complex pattern unit of the equally split pattern type was about 6.39 which was slightly lower than that of the coil including the single pattern unit. In contrast, the quality factor Q of the coil including the complex pattern unit of the non-equally split pattern type was about 9.9 which was higher by about 50% or more than that of the coil including the single pattern unit.

A result of conducting an experiment comparing the efficiencies of charging by wirelessly transmitting power using the coils having resistances, inductances, and quality factors as shown in Table 2 above was as shown in Table 3 below.

TABLE 3

|  | Efficiency (%) |
| --- | --- |
| Single pattern unit | 62.65 |
| Complex pattern unit (equally split pattern type) | 65.26 |
| Complex pattern unit (non-equally split pattern type) | 67.32 |

Referring to Table 3 above, the efficiencies of charging by wirelessly transmitting power were higher in the order of the single pattern unit, the complex pattern unit of the equally split pattern type, and the complex pattern unit of the non-equally split pattern type. That is, the quality factor of the complex pattern unit of the equally split pattern type was relatively low but the efficiency of charging by wirelessly transmitting power using this complex pattern unit was high, compared to those of the single pattern unit. In particular, the complex pattern unit of the non-equally split pattern type had the efficiency of charging of about 67.32% which was higher by about 4% or more than the efficiency of charging using the single pattern unit.

In a large number of mobile devices such as terminals that have been recently put on the market, not only a wireless charging function but also an NFC module is installed to establish NFC. NFC is a proximity communication technology whereby data can be transmitted/received within a short distance of about 10 cm, for example, by using a frequency of 13.56 MHz. The NFC module may be installed in mobile terminal devices and used in various fields of user authentication, identification, credit cards, mobile tickets, mobile coupons, etc.

However, an NFC antenna (coil) is required to establish NFC. In the NFC antenna, an antenna for an NFC reader and an antenna for an NFC tag are independently installed. In general, an integrated dual antenna structure including a stack structure of the antenna for the NFC reader and the antenna for the NFC tag is used in an actual mobile terminal device.

Thus, in order to support both an NFC function and a wireless power transmission function in a mobile terminal device, antennae for the respective functions should be installed together. In this case, an antenna installation space is small since the size of the mobile terminal is limited, and the size and thickness of the mobile terminal device increase due to the two types of antennae. To solve this problem, a dual mode antenna including both an NFC coil and a wireless power coil will be described below.

Figure 19:
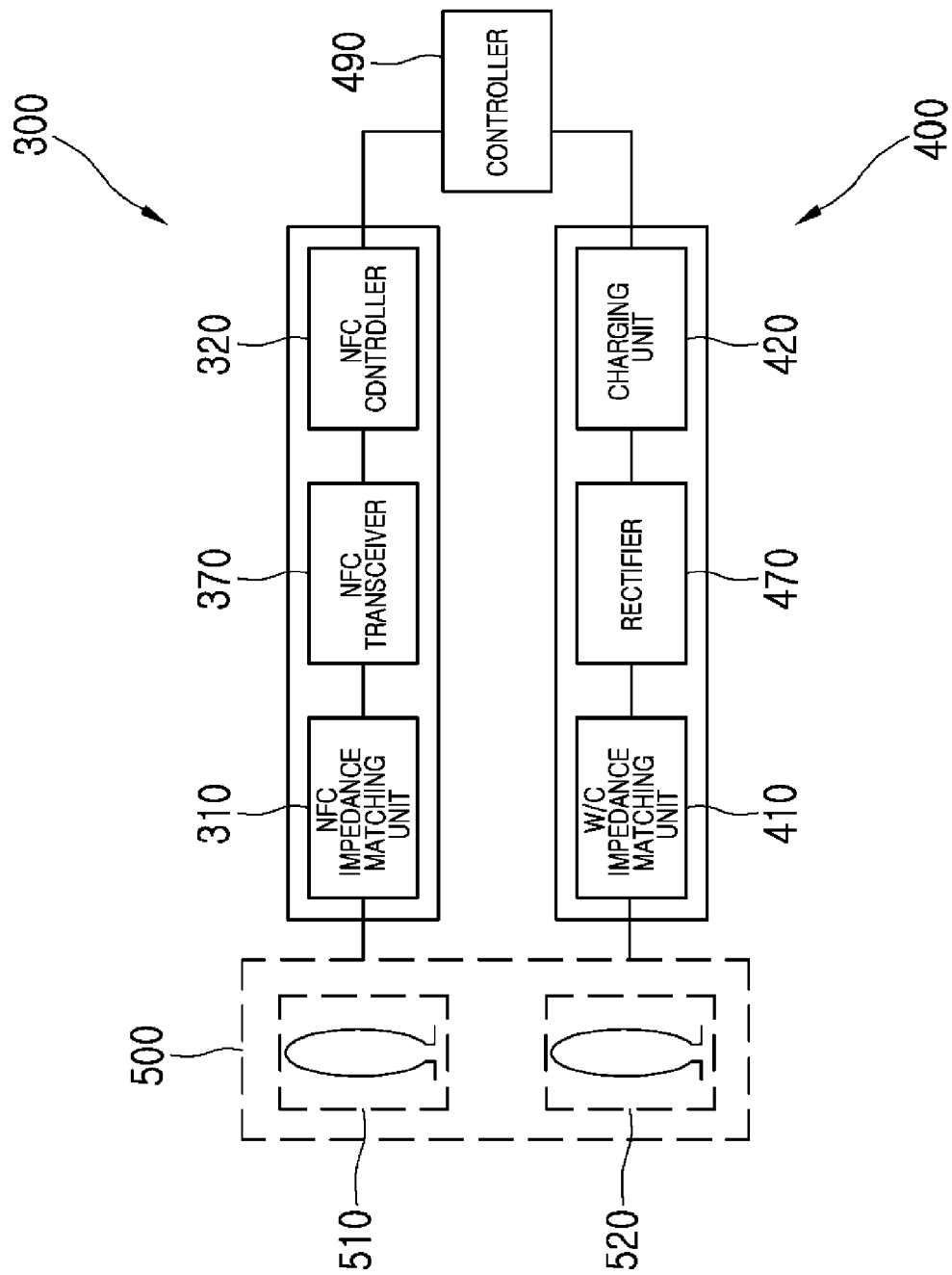
FIG. 19 is a block diagram of a structure of a user terminal with a dual mode antenna according to an embodiment of the present invention.

FIG. 19 is a block diagram of a structure of a user terminal with a dual mode antenna 500 according to an embodiment of the present invention.

Referring to FIG. 19, the user terminal includes an NFC 300 for establishing NFC, and a wireless power transmission module 400 for performing a wireless power transmission function. The user terminal further includes the dual mode antenna 500 that includes an NFC coil 510 electrically connected to the NFC 300 and a wireless power coil 520 electrically connected to the wireless power transmission module 400.

The dual mode antenna 500 may have a dual loop shape in which the NFC coil 510 and the wireless power coil 530 are spaced a predetermined distance from each other. The dual mode antenna 500 may have a structure in which patterns of the NFC coil 510 and the wireless power coil 530 are formed on an insulating sheet (not shown). In this case, the NFC coil 510 and the wireless power coil 530 are electrically disconnected from each other, and impedance matching of a coil may be controlled by adjusting the distance between the NFC coil 510 and the wireless power coil 530 in the dual loop shape formed by the NFC coil 510 and the wireless power coil 530.

In detail, the NFC 300 controls the NFC coil 510 to establish NFC in the user terminal. For example, the NFC 300 may include an NFC impedance matching unit 310, an NFC transceiver 370, and an NFC controller 320.

When an NFC function is requested through a user's manipulation or by running an application installed in the user terminal, a controller 490 of the user terminal operates the NFC 300 to activate the NFC function. The NFC impedance matching unit 310 may be installed between the NFC coil 510 and the NFC transceiver 370 to match an impedance between the NFC coil 510 and the NFC transceiver 370. Although not shown, the NFC transceiver 370 may include a baseband processor, a communication protocol processing circuit, a register file, a universal asynchronous receiver/transmitter (UART) serial interface, etc. Elements of the NFC transceiver 370 have been well-known in this art and are thus not described here. The NFC controller 320 is connected to the NFC transceiver 370 so as to control overall operations of the NFC transceiver 370. Also, the NFC controller 320 may communicate with an external host by using a separate communication interface.

The wireless power transmission module 400 may include a wireless power transmission (W/C) impedance matching unit 410, a rectifier 470, and a charging unit 420.

The wireless power transmission impedance matching unit 410 may be disposed between the wireless power coil 530 and the rectifier 470 to match an impedance between the wireless power coil 530 and the rectifier 470. The rectifier 470 rectifies a power signal received via the wireless power coil 530 into a half-wave rectified form to obtain DC power. A high-frequency noise component may be removed from a DC signal, which is rectified by the rectifier 470, through a filtering unit (not shown), and then the resultant DC signal may be converted into a voltage required to drive the charging unit 420 or a device. The charging unit 420 charges an external load device or an internal battery with the power converted into the required voltage.

Figure 20:
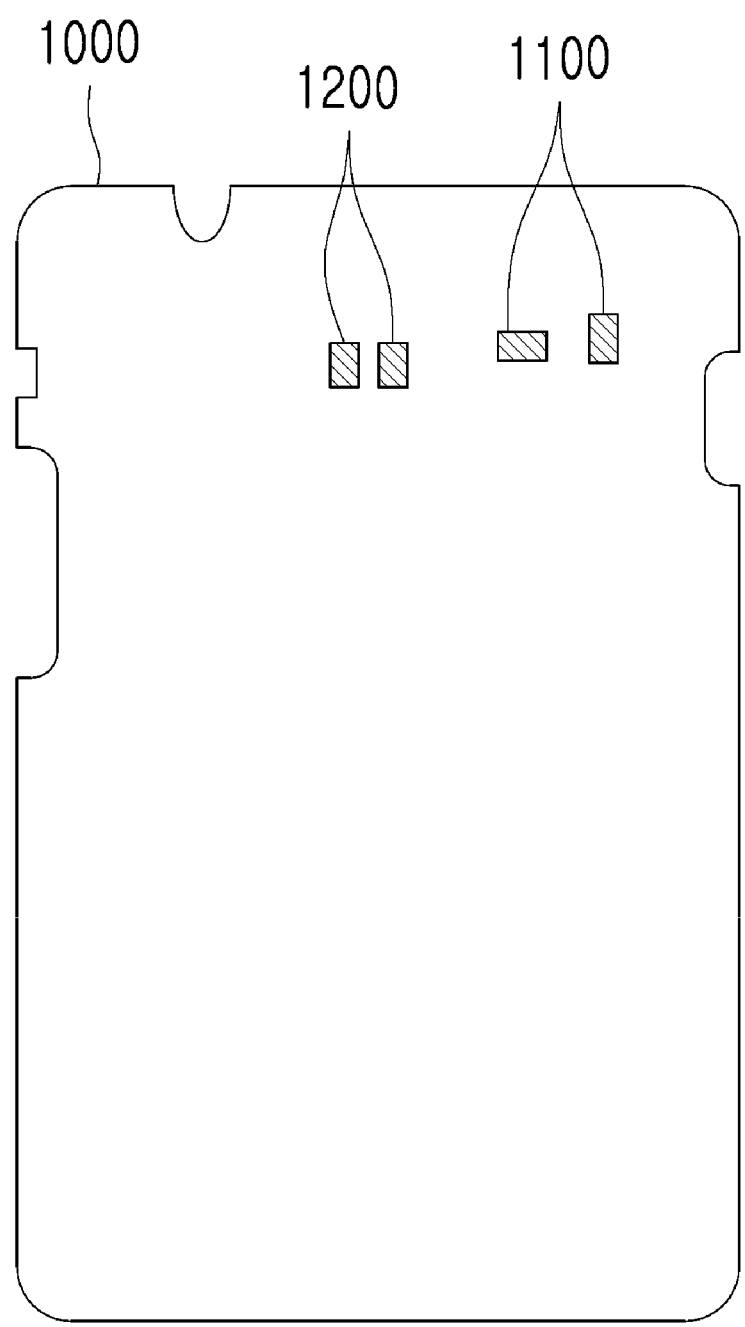
FIG. 20 is a rear view of a main body of a user terminal.
Figure 21:
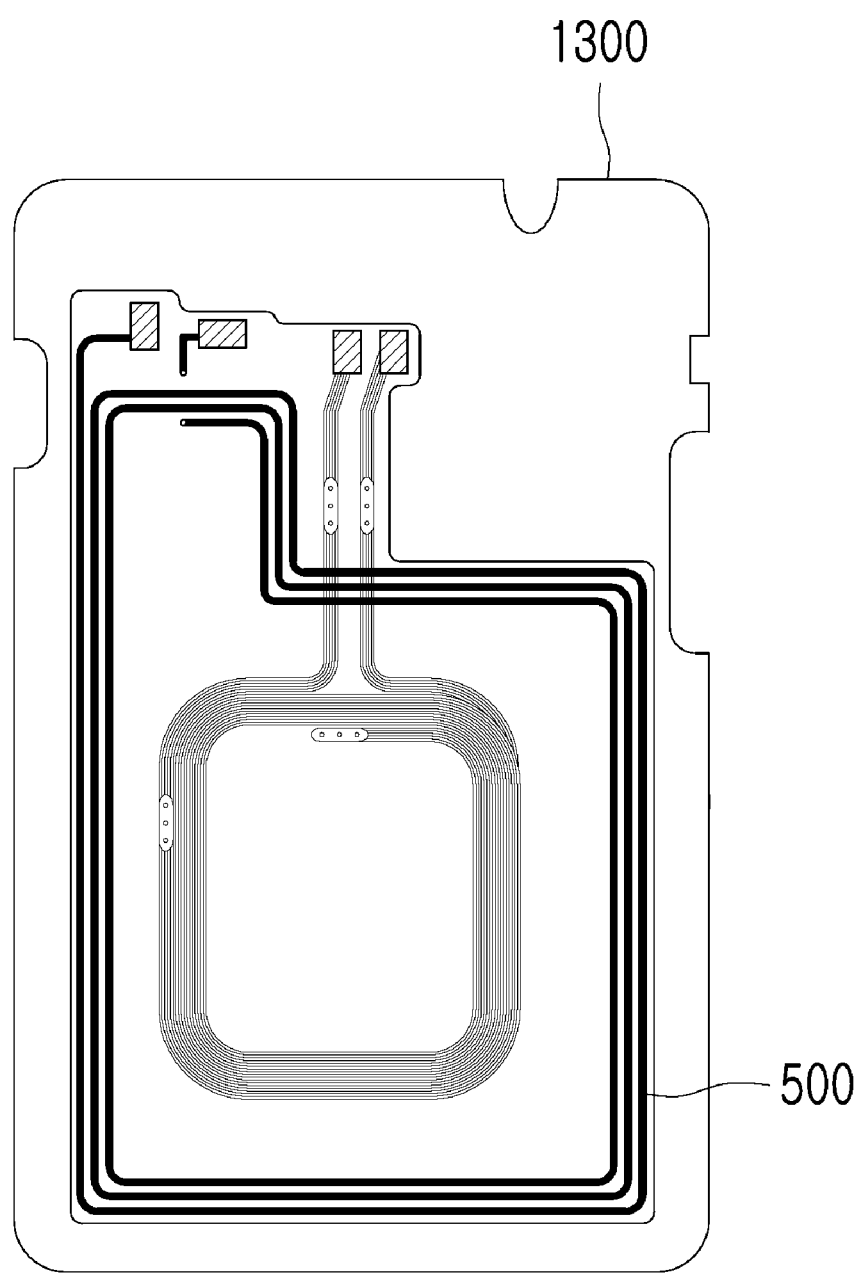
FIG. 21 is a front view of a battery cover of a user terminal.

FIGS. 20 and 21 respectively illustrate a rear view of a main body 1000 of a user terminal and a rear cover of the user terminal to explain a case in which a dual mode antenna 500 according to an embodiment of the present invention is installed in the user terminal.

Referring to FIGS. 20 and 21, the dual mode antenna 500 may be installed on a battery cover 1300 of a user terminal. The dual mode antenna 500 may be attached to an inner side surface of the battery cover 1300 opposite the main body 1000 of the user terminal or may be integrally formed with the inside of the battery cover 1300. When the dual mode antenna 500 is integrally formed with the inside of the battery cover 1300, openings may be formed in an NFC connection terminal 1510 and a wireless power connection terminal 1412 of the dual mode antenna 500 so that the NFC connection terminal 1510 and the wireless power connection terminal 1412 may be exposed via an inner side surface of the battery cover 1300. In this case, the NFC connection terminal 1510 may include a pair of terminals. Similarly, the wireless power connection terminal 1412 may include a pair of terminals.

An NFC module connection terminal 1100 and a wireless power module connection terminal 1200 may be respectively formed on locations on a rear surface of the main body 1000 of the user terminal which correspond to the NFC connection terminal 1510 and the wireless power connection terminal 1412 of the dual mode antenna 500. Thus, when the battery cover 1300 is combined with the main body 1000 of the user terminal, the NFC connection terminal 1510 and the wireless power connection terminal 1412 may be in contact with the NFC module connection terminal 1100 and the NFC module connection terminal 1200 to be electrically connected to the NFC module connection terminal 1100 and the NFC module connection terminal 1200. In this case, the NFC module connection terminal 1100 or the wireless power module connection terminal 1200 may have a C-clip form to be maintained in contact with the NFC connection terminal 1510 or the wireless power connection terminal 1412 by using an elastic force.

A dual mode antenna according to an embodiment of the present invention will be described in detail below.

Figure 22:
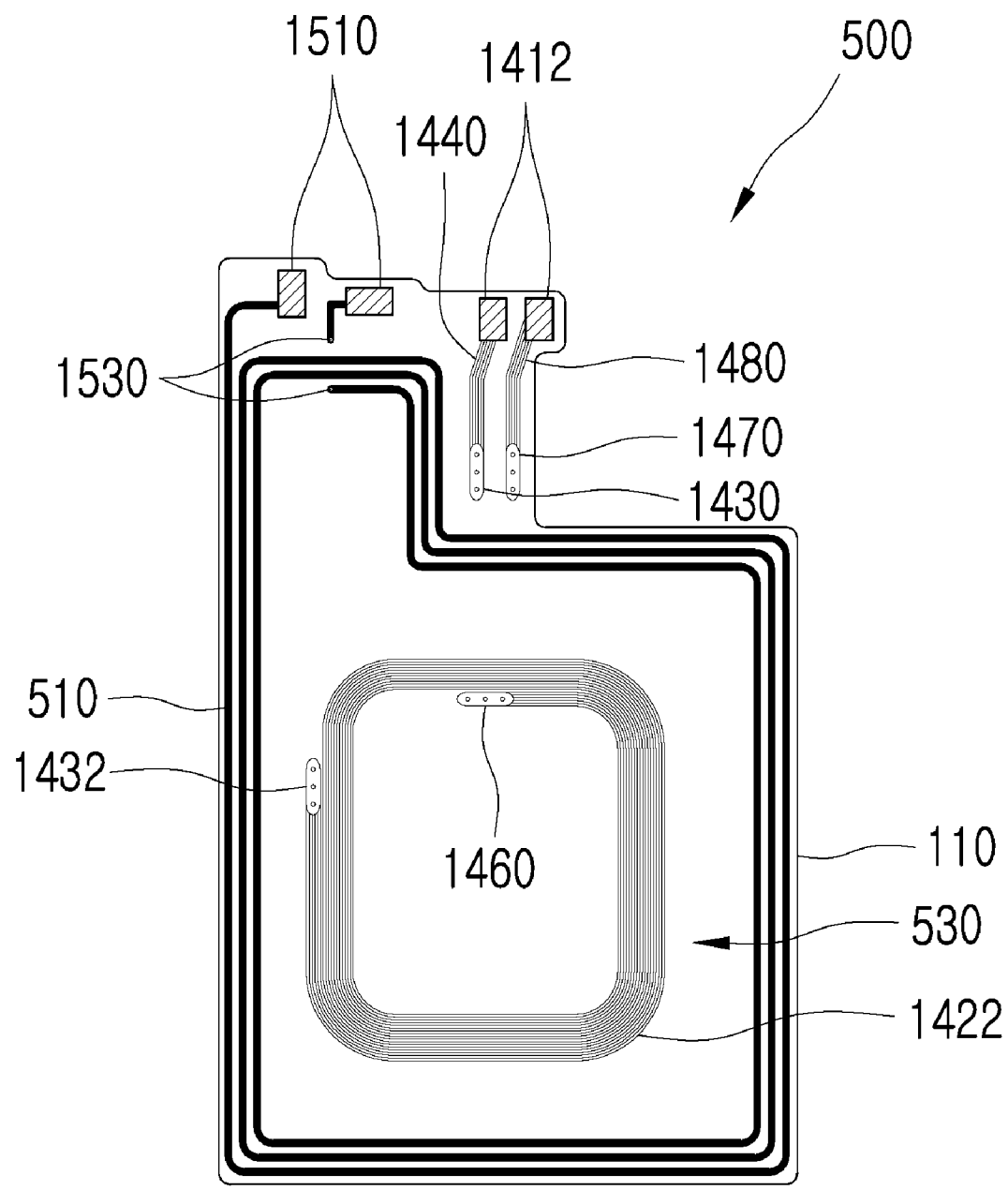
FIG. 22 is a front view of a dual mode antenna according to an embodiment of the present invention.
Figure 23:
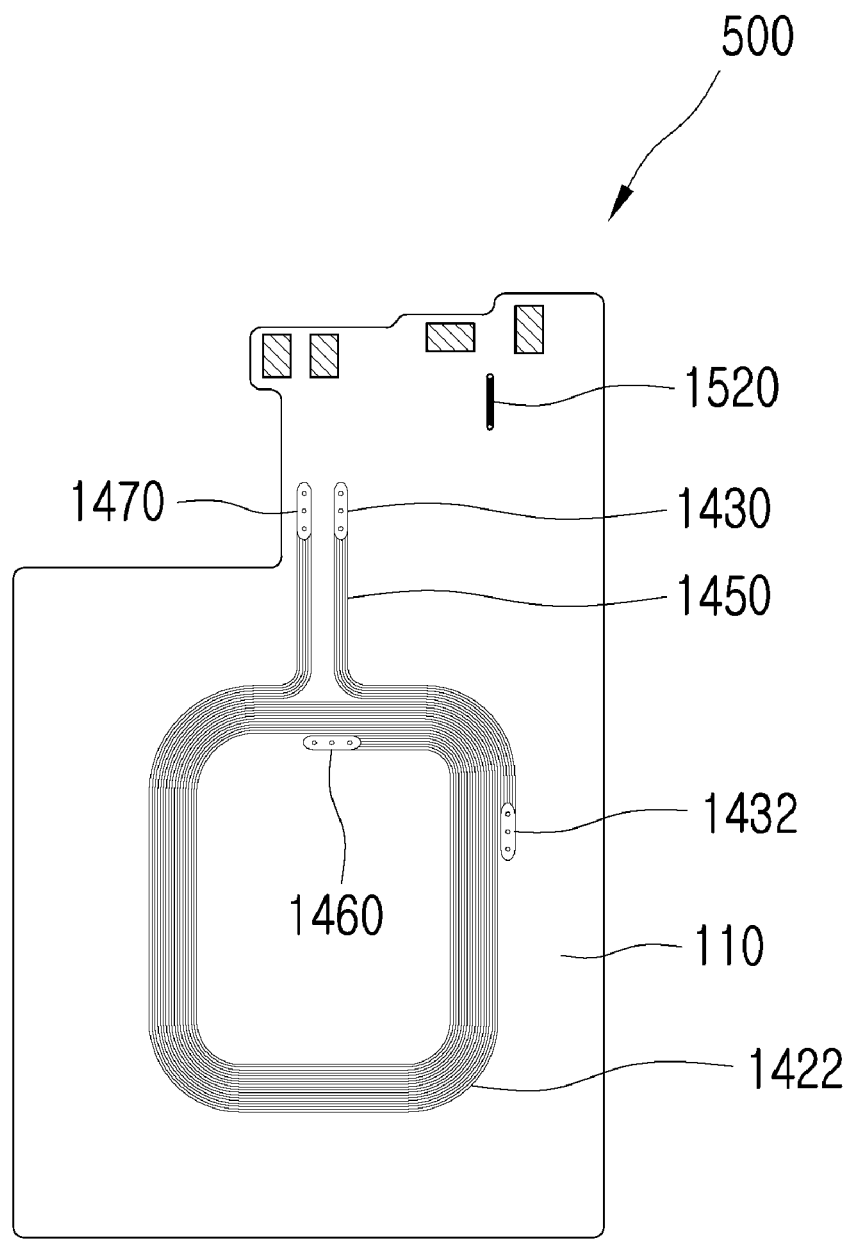
FIG. 23 is a rear view of a dual mode antenna according to an embodiment of the present invention.

FIG. 22 is a front view of the dual mode antenna 500. FIG. 23 is a rear view of the dual mode antenna 500.

Referring to FIGS. 22 and 23, the dual mode antenna 500 may include an insulating sheet 110, an NFC coil 510 formed on the insulating sheet 110 to transmit or receive data; and a wireless power coil 530 formed on the insulating sheet 110, configured to wirelessly transmit or receive power, and including a split pattern unit on at least a region thereof. The split pattern unit includes a plurality of patterns spaced from each other in a widthwise direction.

The insulating sheet 110 and the wireless power coil 530 are substantially the same as the insulating sheet 110 and the wireless power coil 120 or 530 in the previous embodiments and will be described focusing on the differences from the insulating sheet 110 and the wireless power coil 120 or 530.

A pair of NFC connection terminals 1510 may be formed on one surface of the insulating sheet 110 to be connected to both ends of the NFC coil 510. The pair of NFC connection terminals 1510 may be connected to the NFC coil 510 so as to transmit a signal input via an NFC module connection terminal 1100 to the outside or transmit an NFC signal received from the outside to the NFC 300.

The NFC coil 510 may be formed on a top or bottom surface of the insulating sheet 110, and formed as wide as possible along an external side of the insulating sheet 110 to maximize the diameter of a loop and decrease a turn ratio of coils forming the loop and a capacitance between the coils. One end of the NFC coil 510 is connected to one of the pair of NFC connection terminals 1510. The NFC coil 510 has a pattern wound toward the inside thereof to form a loop. One end of the NFC coil 510 in the loop is connected to one of the pair of NFC connection terminals 1510 via vias 1530. In this case, a connection pattern 1520 connecting the vias 1530 may be formed on the bottom surface of the insulating sheet 110.

The wireless power coil 530 may be formed on an inner side of the loop formed by the NFC coil 510. In this case, the diameter of the loop of the wireless power coil 530 is less than that of the loop formed by the NFC coil 510. Thus, in order to secure a necessary turn ratio, the wireless power coil 530 may be formed in a stack structure on the top and bottom surfaces of the insulating sheet 110 as described above.

Thus, a pattern of the wireless power coil 530 is differentiated from patterns of the wireless power coils 120 and 530 in the previous embodiments due to the NFC coil 510. That is, in the present embodiment, the wireless power coil 530 includes a first extension pattern 1440 extending while being connected to one of wireless power connection terminals 1412. The first extension pattern 1440 is connected a via 1430, etc. to a second extension pattern 1450 formed on the bottom surface of the insulating sheet 110, so that the first extension pattern 1440 may be separated from the NFC coil 510. The second extension pattern 1450 extends by a predetermined distance and is connected via a via 1432, etc. to a first pattern unit 1422 formed on the top surface of the insulating sheet 110. The first pattern unit 1422 forms a loop shape that converges to the inside thereof and is connected via a current-carrying unit 1460 to the second pattern unit 1424 formed on the bottom surface of the insulating sheet 110, and the first pattern unit 1422 and the second pattern unit 1424 each include a split pattern unit, similar to the previous embodiments. The above structures are not redundantly described here.

The second pattern unit 1424 on the bottom surface of the insulating sheet 110 extends toward the wireless power connection terminals 1412, passes by the NFC coil 510, and is connected to a third extension pattern 1480 on the top surface of the insulating sheet 110 via a via 1470 to be connected to one of the wireless power connection terminals 1412.

According to the one or more of the above embodiments, a wireless power antenna includes a split pattern unit with a plurality of patterns to reduce a non-conducting region, thereby remarkably improving a quality factor.

Furthermore, a turn ratio of a coil required to wirelessly transmit or receive power may be sufficiently secured by forming a wireless power coil on both top and bottom surfaces of one insulating sheet.

Also, a dual mode antenna having a simple and thin structure in which both a wireless power coil and an NFC coil are formed on one insulating sheet, and capable of wirelessly transmitting, receiving, or relaying power and establishing NFC may be provided.

Although the present invention has been described above with reference to the exemplary embodiments thereof, it would be understood by those skilled in the art that various changes and modifications may be made without departing from the technical conception and essential features of the present invention. Thus, it is clear that all modifications are included in the technical scope of the present invention as long as they include the components as claimed in the claims of the present invention.

What is claimed is:

1. A dual mode antenna comprising:
    an insulating sheet;
    a near-field communication (NFC) coil provided on the insulating sheet to transmit and receive data; and
    a wireless power coil provided on the insulating sheet to wirelessly transmit and receive power, and including:
        a core wire wound in a loop shape on the insulating sheet; and
        a split pattern unit formed at a portion of the core wire and including a plurality of patterns having a width of 0.10 mm to 0.20 mm and which are spaced apart from each other in a widthwise direction of the core wire,
    wherein the plurality of patterns comprise a main pattern and at least one sub-pattern, and
    wherein at least one of a width and a height of the main pattern exceeds a width or height of the at least one sub-pattern.

2. The dual mode antenna of claim 1, further comprising a pair of wireless power connection terminals formed on one surface of the insulating sheet, and electrically connected to both ends of the wireless power coil, and
    wherein the split pattern unit is spaced a predetermined distance from the pair of wireless power connection terminals.

3. The dual mode antenna of claim 1, wherein the split pattern unit is disposed on both a top surface and a bottom surface of the insulating sheet.

4. The dual mode antenna of claim 3, wherein the split pattern unit comprises:
    a first split pattern unit formed on the top surface of the insulating sheet; and
    a second split pattern unit formed on the bottom surface of the insulating sheet and electrically connected to the first split pattern unit.

5. The dual mode antenna of claim 4, wherein current flows through the first split pattern unit and the second split pattern unit in the same direction, when viewed in front of the dual mode antenna.

6. The dual mode antenna of claim 4, wherein the first split pattern unit and the second split pattern unit are disposed on a same position to be symmetrical to each other with respect to the insulating sheet.

7. The dual mode antenna of claim 4, wherein patterns of the first split pattern unit and patterns of the second split pattern unit are disposed at different positions in a zigzag fashion with respect to the insulating sheet.

8. The dual mode antenna of claim 1, wherein widths of patterns of the split pattern unit are determined such that non-conducting regions are not generated in the patterns.

9. The dual mode antenna of claim 8, wherein the widths of the patterns of the split pattern unit are determined to be twice or less a surface thickness which current is capable of penetrating.

10. The dual mode antenna of claim 1, wherein the split unit comprises two or more sub-patterns having same widths and heights.

11. The dual mode antenna of claim 1, wherein the split pattern unit comprises two or more sub-patterns having different widths, different heights, or different widths and heights.

* * * * *